United States Patent
Lehtiniemi et al.

(10) Patent No.: US 10,732,720 B2
(45) Date of Patent: Aug. 4, 2020

(54) INPUT AXIS BETWEEN AN APPARATUS AND A SEPARATE APPARATUS

(71) Applicant: Nokia Technologies Oy, Espoo (FI)

(72) Inventors: Arto Lehtiniemi, Lempäälä (FI); Antti Eronen, Tampere (FI); Peter Eskolin, Pirkkala (FI); Juha Arrasvuori, Tampere (FI); Matthew Coyle-Gilchrist, Espoo (FI)

(73) Assignee: Nokia Technologies Oy, Espoo (FI)

( * ) Notice: Subject to any disclaimer, the term of this patent is extended or adjusted under 35 U.S.C. 154(b) by 147 days.

(21) Appl. No.: 15/122,678

(22) PCT Filed: Feb. 27, 2015

(86) PCT No.: PCT/FI2015/050119
§ 371 (c)(1),
(2) Date: Aug. 31, 2016

(87) PCT Pub. No.: WO2015/132461
PCT Pub. Date: Sep. 11, 2015

(65) Prior Publication Data
US 2017/0068320 A1    Mar. 9, 2017

(30) Foreign Application Priority Data
Mar. 3, 2014    (EP) .................................... 14157426

(51) Int. Cl.
*G06F 3/01*     (2006.01)
*G06F 3/0484*   (2013.01)
(Continued)

(52) U.S. Cl.
CPC .............. *G06F 3/017* (2013.01); *G06F 3/011* (2013.01); *G06F 3/0487* (2013.01);
(Continued)

(58) Field of Classification Search
CPC .... G06F 3/017; G06F 3/04847; G06F 3/0487; G06F 3/011; G06F 3/165; G06F 3/04883;
(Continued)

(56) References Cited

U.S. PATENT DOCUMENTS 7,978,091 B2    7/2011  Boillot
9,389,594 B2    7/2016  Arrasvuori et al.
(Continued)

FOREIGN PATENT DOCUMENTS

EP    2302883 A1    3/2011
EP    2348383 A1    7/2011
(Continued)

OTHER PUBLICATIONS

"Pyreos: Gesture Control—Low Power, Smal Size", Youtube, Retrieved on Feb. 6, 2017, Webpage available at : https://www.youtube.com/watch?v=0YpI3J2IThA&feature=player_embedded.
(Continued)

*Primary Examiner* — Alexander Eisen
*Assistant Examiner* — Kebede T Teshome
(74) *Attorney, Agent, or Firm* — Alston & Bird LLP

(57) ABSTRACT

A method comprising determining an input axis that extends between an apparatus and a separate apparatus, receiving information indicative of an input object, the input object being proximate to the input axis, determining an input axis position on the input axis based, at least in part, on the input object, and determining an operational directive based, at least in part, on the input axis position is disclosed.

18 Claims, 10 Drawing Sheets

(51) Int. Cl.
  *G06F 3/0487* (2013.01)
  *G06F 3/0485* (2013.01)
  *G06F 3/03* (2006.01)
  *G06F 3/0488* (2013.01)
  *G06F 3/16* (2006.01)
  *H04W 12/06* (2009.01)

(52) U.S. Cl.
  CPC ........ *G06F 3/04847* (2013.01); *G06F 3/0304* (2013.01); *G06F 3/0485* (2013.01); *G06F 3/04855* (2013.01); *G06F 3/04883* (2013.01); *G06F 3/165* (2013.01); *H04W 12/06* (2013.01)

(58) Field of Classification Search
  CPC .. G06F 3/0485; G06F 3/04855; G06F 3/0304; H04W 12/06
  See application file for complete search history.

(56) References Cited

U.S. PATENT DOCUMENTS

| | | |
|---|---|---|
| 2009/0265470 A1 | 10/2009 | Shen et al. |
| 2010/0231509 A1 | 9/2010 | Boillot et al. |
| 2011/0080490 A1* | 4/2011 | Clarkson ............ G06F 3/017 348/222.1 |
| 2011/0249024 A1 | 10/2011 | Arrasvuori et al. |
| 2011/0316790 A1 | 12/2011 | Ollila et al. |
| 2012/0131518 A1* | 5/2012 | Lee ............ G06F 3/011 715/863 |
| 2012/0326966 A1 | 12/2012 | Rauber |
| 2013/0050069 A1* | 2/2013 | Ota ............ G06F 3/011 345/156 |
| 2013/0229508 A1 | 9/2013 | Li et al. |
| 2014/0145942 A1* | 5/2014 | Kuno ............ G06F 3/017 345/156 |
| 2014/0157210 A1* | 6/2014 | Katz ............ G06F 3/017 715/863 |
| 2014/0320383 A1* | 10/2014 | Goto ............ G02B 27/017 345/8 |
| 2017/0347265 A1* | 11/2017 | Shin ............ H04W 12/06 |

FOREIGN PATENT DOCUMENTS

| | | |
|---|---|---|
| EP | 2455841 A2 | 5/2012 |
| EP | 2610708 A1 | 7/2013 |
| JP | 2012 032945 A | 2/2012 |
| JP | 2012032945 A * | 2/2012 |
| WO | 2007096893 A2 | 8/2007 |
| WO | 2009/074887 A1 | 6/2009 |
| WO | 2009144685 A2 | 12/2009 |
| WO | 2012141350 A1 | 10/2012 |
| WO | 2012/153227 A1 | 11/2012 |
| WO | 2013094786 A1 | 6/2013 |

OTHER PUBLICATIONS

"Samsung Galaxy S4 Display, Air View and Air Gesture Demoed on Video", Phone Arena.com, Retrieved on Feb. 6, 2017, Webpage available at : http://www.phonearena.com/news/Samsung-Galaxy-S-4-display-Air-View-and-Air-Gesture-demoed-on-video_id40881.
"Sony Experia Sola", Sony, Retrieved on Feb. 15, 2017, Webpage available at : http://www.sony.co.in/local/product/xperia+sola.
"Xperia Sola with Floating Touch", Sony, Retrieved on Feb. 6, 2017, Webpage available at : http://developer.sonymobile.com/knowledgebase/technologies/floating-touch/.
Office action received for corresponding Vietnam Patent Application No. 1-2016-03511, dated Jan. 26, 2017, 2 pages.
Final Office action received for corresponding Japanese Patent Application No. 2016-555291, dated Feb. 9, 2018, 2 pages of office action and 3 pages of office action translation available.
International Search Report and Written Opinion received for corresponding Patent Cooperation Treaty Application No. PCT/FI2015/050119, dated Jul. 24, 2015, 20 pages.
Extended European Search Report dated Sep. 17, 2014 for corresponding Patent Application No. 14157426.9.
Office Action received for corresponding European Patent Application No. 14157426.9, dated Apr. 17, 2018, 7 pages.
Office Action for Mexican Application No. MX/a/2016/011368 dated Oct. 15, 2018, 4 pages.
Office Action for Mexican Application No. MX/a/2016/011368 dated Apr. 4, 2019, 5 pages.
Partial European Search Report for Application No. EP 14157426.9 dated Jun. 17, 2014, 7 pages.
Office Action for Japanese Application No. 2016-555291 dated Apr. 23, 2019, 17 pages.
Office Action for Mexican Application No. MX/a/2016/011368 dated Aug. 14, 2019, 6 pages.
Intention to Grant for European Application No. 14 157 426.9 dated Jul. 11, 2019, 5 pages.
Office Action for Vietnamese Application No. 1-2016-03511 dated Dec. 31, 2019, 4 pages.
Decision to Grant for European Application No. 14157426.9 dated Oct. 24, 2019, 2 pages.
Office Action for Mexican Application No. MX/a/2016/011368 dated Mar. 2, 2020, 5 pages.

* cited by examiner

INPUT AXIS BETWEEN AN APPARATUS AND A SEPARATE APPARATUS

RELATED APPLICATION

This application was originally filed as Patent Cooperation Treaty Application No. PCT/FI2015/050119 filed Feb. 27, 2015 which claims priority benefit to European Patent Application No. 14157426.9, Mar. 3, 2014.

TECHNICAL FIELD

The present application relates generally to an input axis between an apparatus and a separate apparatus.

BACKGROUND

Electronic apparatuses are becoming increasingly accessible and increasingly powerful. Users of electronic apparatus utilize electronic apparatuses in relation to many aspects of their lives. As such, users are constantly interacting with their electronic apparatuses. In some circumstances, it may be desirable to configure an electronic apparatus such that a user of the electronic apparatus may interact with the electronic apparatus.

SUMMARY

Various aspects of examples of the invention are set out in the claims.

One or more embodiments may provide an apparatus, a computer readable medium, a non-transitory computer readable medium, a computer program product, and a method for determining an input axis that extends between an apparatus and a separate apparatus, receiving information indicative of an input object, the input object being proximate to the input axis, determining an input axis position on the input axis based, at least in part, on the input object, and determining an operational directive based, at least in part, on the input axis position.

One or more embodiments may provide an apparatus, a computer readable medium, a computer program product, and a non-transitory computer readable medium having means for determining an input axis that extends between an apparatus and a separate apparatus, means for receiving information indicative of an input object, the input object being proximate to the input axis, means for determining an input axis position on the input axis based, at least in part, on the input object, and means for determining an operational directive based, at least in part, on the input axis position.

An apparatus comprising at least one processor and at least one memory, the memory comprising machine-readable instructions, that when executed cause the apparatus to perform determination of an input axis that extends between an apparatus and a separate apparatus, receipt of information indicative of an input object, the input object being proximate to the input axis, determination of an input axis position on the input axis based, at least in part, on the input object, and determination of an operational directive based, at least in part, on the input axis position.

In at least one example embodiment, the operational directive corresponds with an operational directive type.

In at least one example embodiment, the operational directive type corresponds with a parameter adjustment operational directive that causes a parameter to be set to a value.

In at least one example embodiment, the value is based, at least in part, on the input axis position.

In at least one example embodiment, the parameter is a video playback position parameter, and the value is a video playback position.

In at least one example embodiment, the parameter is a video scene parameter, and the value is a video scene.

In at least one example embodiment, the parameter is an audio playback position parameter, and the value is an audio playback position.

In at least one example embodiment, the parameter is an audio item parameter, and the value is an audio item.

In at least one example embodiment, the parameter is a game input position parameter, and the value is a game input position.

In at least one example embodiment, the parameter is a tag parameter, and the value is a tag.

In at least one example embodiment, the parameter is an output volume parameter, and the value is an output volume.

In at least one example embodiment, the parameter is an input volume parameter, and the value is an input volume.

In at least one example embodiment, the parameter is a file transfer parameter, and the value is indicative of a file.

In at least one example embodiment, the parameter is an instrument playback parameter, and the value is a pitch.

In at least one example embodiment, the operational directive type corresponds with a separate apparatus authentication operational directive that causes establishment of a pairing association between the apparatus and the separate apparatus.

In at least one example embodiment, the input axis is a cross apparatus delineation that extends between a point on the apparatus and a point on the separate apparatus.

In at least one example embodiment, the input object is an object having a predetermined characteristic that indicates that the object is intended to invoke the determination of the operational directive.

In at least one example embodiment, the predetermined characteristic is a characteristic that is identifiable by at least one sensor that detects the input object.

In at least one example embodiment, the input object is at least one of a finger, a single finger, two fingers, a hand, an arm, a stylus, or a wearable apparatus.

In at least one example embodiment, the input object being proximate to the input axis corresponds with the input object being within a threshold distance from the input axis.

In at least one example embodiment, the threshold distance is a distance from the input axis within which the input object is determined to be proximate to the input axis.

One or more example embodiments further perform determination that the input object is proximate to the input axis, wherein the determination of the position on the input axis is based, at least in part, on the determination that the input object is proximate to the input axis.

One or more example embodiments further perform receipt of different information indicative of the input object, the input object failing to be proximate to the input axis, determination that the input object fails to be proximate to the input axis, and preclusion of determination of a different position on the input axis based, at least in part, on the determination that the input object fails to be proximate to the input axis.

In at least one example embodiment, the determination of the input axis position on the input axis comprises determination of an input object correspondence delineation perpendicular to the input axis that intersects at least a part of the input object and determination of the input axis position to be a position on the input axis where the input object correspondence delineation intersects the input axis.

In at least one example embodiment, the determination of the input axis position on the input axis comprises determination of the input axis position to be a position on the input axis where the input object intersects the input axis.

In at least one example embodiment, the determination of the operational directive comprises correlation of the input axis position with the operational directive.

In at least one example embodiment, the determination of the operational directive comprises correlation of the input axis position with a predetermined input axis position that is associated with the operational directive.

In at least one example embodiment, the determination of the operational directive comprises correlation of the input axis position with a predetermined input axis position range that is associated with the operational directive.

In at least one example embodiment, the operational directive is a directive that instructs the apparatus to perform a particular set of operations that are associated with the directive.

In at least one example embodiment, the operational directive identifies at least one operation of the set of operations.

One or more example embodiments further perform causation of performance of one or more operation in conformance with the operational directive.

In at least one example embodiment, the causation of performance of the operation in conformance with the operational directive comprises performance of the operation in conformance with the operational directive.

In at least one example embodiment, the causation of performance of the operation in conformance with the operational directive comprises sending of the operational directive to a separate apparatus such that the separate apparatus is caused to perform the operation in conformance with the operational directive.

One or more example embodiments further perform determination of an input object classification based, at least in part, on the information indicative of the input object, wherein the determination of the operational directive is based, at least in part, on the input object classification.

In at least one example embodiment, the input object classification identifies a characteristic of the input object.

In at least one example embodiment, the input object classification is indicative of at least one of a finger, a single finger, two fingers, a hand, an arm, a stylus, or a wearable apparatus.

In at least one example embodiment, the input axis position is indicative of a position relative to a distance between the apparatus and the separate apparatus.

In at least one example embodiment, the input axis position is indicative of a percentage of the distance between the apparatus and the separate apparatus.

In at least one example embodiment, the input axis position is indicative of a percentage of the distance from the apparatus to separate apparatus.

In at least one example embodiment, the input axis position is indicative of a percentage of the distance from the separate apparatus to apparatus.

One or more example embodiments further perform determination of the distance between the apparatus and the separate apparatus.

In at least one example embodiment, the input axis position corresponds with an input axis segment, and the determination of the operational directive is based, at least in part, on the input axis segment.

In at least one example embodiment, the input axis segment identifies a range of input axis positions that correspond with a particular operational directive.

In at least one example embodiment, the input axis position corresponds with an input axis partition, and the determination of the operational directive is based, at least in part, on the input axis partition.

In at least one example embodiment, the input axis partition identifies a range of input axis positions that correspond with an operational directive type.

One or more example embodiments further perform receipt of information indicative of movement of the input object, the input object remaining proximate to the input axis, determination of a different input axis position on the input axis based, at least in part, on the input object, and determination of a different operational directive based, at least in part, on the different input axis position.

In at least one example embodiment, the input axis position corresponds with an input axis segment and the different input axis position corresponds with a different input axis segment, the determination of the operational directive is based, at least in part, on the input axis segment, and the determination of the different operational directive is based, at least in part, on the different input axis segment.

In at least one example embodiment, the input axis position corresponds with an input axis segment and the different input axis position corresponds with the input axis segment, the determination of the operational directive is based, at least in part, on the input axis segment, and the determination of the different operational directive is based, at least in part, on the input axis segment.

In at least one example embodiment, the input axis position corresponds with an input axis partition and the different input axis position corresponds with a different input axis partition, the determination of the operational directive is based, at least in part, on the input axis partition, and the determination of the different operational directive is based, at least in part, on the different input axis partition.

In at least one example embodiment, the input axis position corresponds with an input axis partition and the different input axis position corresponds with the input axis partition, the determination of the operational directive is based, at least in part, on the input axis partition, and the determination of the different operational directive is based, at least in part, on the input axis partition.

In at least one example embodiment, the operational directive causes the apparatus to perform determination of an apparatus authentication parameter based, at least in part, on the input axis position, sending of an authentication request to the separate apparatus, receipt of an authentication response from the separate apparatus that is indicative of a separate apparatus authentication parameter, determination that the separate apparatus authentication parameter corresponds with the apparatus authentication parameter, and causation of an establishment of a pairing association between the apparatus and the separate apparatus.

One or more example embodiments further perform receipt of information indicative of movement of the input object, the input object remaining proximate to the input axis, determination of a different input axis position on the input axis based, at least in part, on the input object, and determination that the different input axis position is further from the apparatus than the input axis position, wherein the determination of the operational directive is based, at least in part, on the determination that the different input axis position is further from the apparatus than the input axis position.

In at least one example embodiment, the operational directive is a separate apparatus authentication directive.

One or more example embodiments further perform receipt of an authentication request from the separate apparatus, wherein the operational directive causes the apparatus to perform determination of an apparatus authentication parameter based, at least in part, on the input axis position, and sending of an authentication response to the separate apparatus that is indicative of the apparatus authentication parameter.

One or more example embodiments further perform causation of display of a slider interface element by the separate apparatus, wherein the operational directive causes setting of a slider interface element selection point to correspond with the input axis position.

In at least one example embodiment, the slider interface element is associated with a parameter, and the slider interface element selection point is associated with a value of the parameter.

One or more example embodiments further perform causation of display of the slider interface element selection point in relation to the slider interface element.

BRIEF DESCRIPTION OF THE DRAWINGS

For a more complete understanding of embodiments of the invention, reference is now made to the following descriptions taken in connection with the accompanying drawings in which.

DETAILED DESCRIPTION OF THE DRAWINGS

Figure 1:
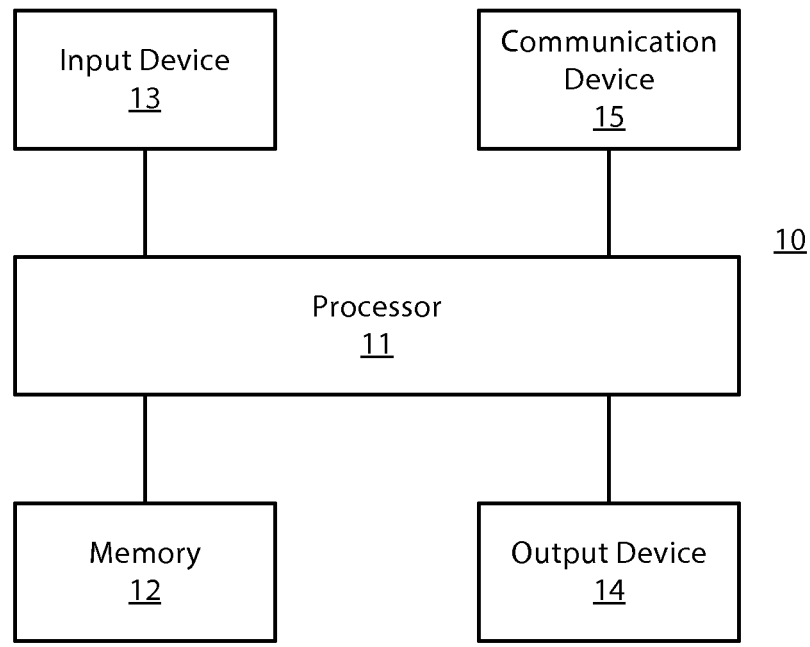
FIG. 1 is a block diagram showing an apparatus according to at least one example embodiment.

An embodiment of the invention and its potential advantages are understood by referring to FIGS. 1 through 10 of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses may readily employ embodiments of the invention. Electronic apparatus 10 may be a personal digital assistant (PDAs), a pager, a mobile computer, a desktop computer, a television, a gaming apparatus, a laptop computer, a tablet computer, a media player, a camera, a video recorder, a mobile phone, a global positioning system (GPS) apparatus, an automobile, a kiosk, an electronic table, and/or any other types of electronic systems. Moreover, the apparatus of at least one example embodiment need not be the entire electronic apparatus, but may be a component or group of components of the electronic apparatus in other example embodiments. For example, the apparatus may be an integrated circuit, a set of integrated circuits, and/or the like.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries. For example, the apparatus may be, at least part of, a non-carryable apparatus, such as a large screen television, an electronic table, a kiosk, an automobile, and/or the like.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus that comprises a display, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

Figure 2:
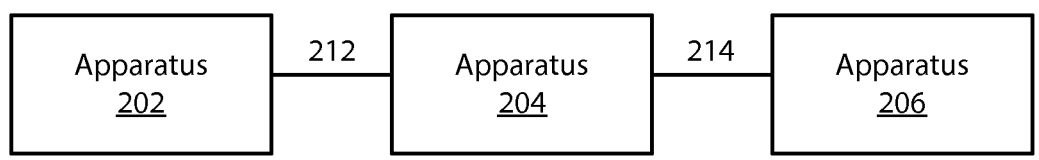
FIG. 2 is a block diagram showing apparatus communication according to at least one example embodiment.

FIG. 2 is a block diagram showing apparatus communication according to at least one example embodiment. The example of FIG. 2 is merely an example and does not limit the scope of the claims. For example, apparatus count may vary, apparatus configuration may vary, communication channels may vary, and/or the like.

In the example of FIG. 2, apparatus 202 communicates with apparatus 204 by way of communication channel 212, and apparatus 204 communicates with apparatus 206 by way of communication channel 214. For example, apparatus 202 may send information to apparatus 204 by way of communication channel 212, apparatus 202 may receive information sent from apparatus 204 by way of communication channel 212, and/or the like. In another example, apparatus 204 may send information to apparatus 206 by way of communication channel 214, apparatus 204 may receive information sent from apparatus 206 by way of communication channel 214, and/or the like. In the example of FIG. 2, apparatus 202 may indirectly communicate with apparatus 206 via apparatus 204 by way of communication channels 212 and 214, and apparatus 206 may indirectly communicate with apparatus 202 via apparatus 204 by way of communication channels 214 and 212. For example, apparatus 202 may cause sending of information to apparatus 204 by way of communication channel 212, and apparatus 204 may forward the information received from apparatus 202 to apparatus 206 by way of communication channel 214. Similarly, apparatus 202 may receive information from apparatus 206 by way of apparatus 204. In such an example, apparatus 204 may receive information from apparatus 206 by way of communication channel 214, and may forward the information received from apparatus 206 to apparatus 202 by way of communication channel 212. In at least one example embodiment, apparatus 202 is in direct communication with apparatus 206 by way of a direct communication channel between apparatus 202 and apparatus 206.

It should be understood that, even though the example of FIG. 2 illustrates a direct communication channel between apparatus 202 and apparatus 204, and between apparatus 204 and apparatus 206, there may be intermediate apparatuses that facilitate communication between apparatus 202 and apparatus 204, and/or between apparatus 204 and apparatus 206. For example, there may be one or more routers, hubs, switches, gateways, and/or the like, that are utilized in the communication channels between apparatus 202 and apparatus 204, and/or between apparatus 204 and apparatus 206. In addition, there may be other separate apparatuses that apparatus 202, apparatus 204, and/or apparatus 206 are in communication with. For example, apparatus 202, apparatus 204, and/or apparatus 206 may be in communication with another apparatus, a separate apparatus, a different apparatus, and/or the like.

In some circumstances, a user may desire to have collaboration between apparatuses, such as between an apparatus and a separate apparatus, based on their proximity with each other. For example, it may be intuitive for a user to manage collaboration between apparatuses that are local to each other. A plurality of apparatuses may be proximate to each other based on location, availability of local communication among the apparatuses, and/or the like. For example, if the apparatuses collaborate by way of low power radio frequency communication, a radio frequency communication, near field communication, inductive communication, electric field communication, Bluetooth communication, infrared communication, local area network communication, wireless local area network communication, and/or the like, the apparatuses may be considered to be proximate with each other based, at least in part, on availability of such proximity-based communication with each other. In at least one example embodiment, an apparatus may be a phone, a tablet, a computer, a wearable apparatus, a head worn apparatus, a hand worn apparatus, an electronic apparatus, a peripheral apparatus, a host apparatus, and/or the like. In at least one example embodiment, apparatuses communicate with each other. For example, an apparatus may be an apparatus that automatically communicates with another apparatus for purposes such as identifying the apparatus, synchronizing data, exchanging status information, and/or the like. In at least one example embodiment, an apparatus retains information associated with communication with a separate apparatus. For example, the apparatus may comprise information associated with identifying, communicating with, authenticating, performing authentication with, and/or the like, the separate apparatus. In this manner, the apparatus may be privileged to perform operations in conjunction with the separate apparatus that a different apparatus may lack the privilege to perform.

In at least one example embodiment, communication based, at least in part, on short range communication is referred to as proximity-based communication. In at least one example embodiment, proximity-based communication relates to wireless communication that is associated with a short range, such as low power radio frequency communication, radio frequency communication, near field communication, inductive communication, electric field communication, Bluetooth communication, infrared communication, local area network communication, wireless local area network communication, and/or the like. In such an example, the exchange of information may be by way of the short range wireless communication between the apparatus and a separate apparatus, host apparatus, and/or the like.

In at least one example embodiment, a proximity-based communication channel is a low power radio frequency communication channel, a radio frequency communication channel, a near field communication channel, a wireless communication channel, a wireless local area network communication channel, a Bluetooth communication channel, an electric field communication channel, an inductive communication channel, an infrared communication channel, and/or the like. For example, as depicted in FIG. 2, apparatus 202 communicates with apparatus 204 by way of a communication channel 212. In the example of FIG. 2, communication channel 212 may be a low power radio frequency communication channel, a radio frequency communication channel, a near field communication channel, a wireless communication channel, a wireless local area network communication channel, a Bluetooth communication channel, an electric field communication channel, an inductive communication channel, an infrared communication channel, and/or the like. Similarly, as depicted in FIG. 2, apparatus 204 communicates with apparatus 206 by way of communication channel 214. In the example of FIG. 2, communication channel 214 may be a low power radio frequency communication channel, a radio frequency communication channel, a near field communication channel, a wireless communication channel, a wireless local area network communication channel, a Bluetooth communication channel, an electric field communication channel, an inductive communication channel, an infrared communication channel, and/or the like.

In at least one example embodiment, an apparatus and a separate apparatus communicate by way of non-proximity-based communication channels. For example, as depicted in FIG. 2, apparatus 204 communicates with apparatus 206 by way of communication channel 214. In the example of FIG. 2, communication channel 214 may be a local area network communication channel, a wide area network communication channel, an internet communication channel, a cellular communication channel, and/or the like.

Figure 3A:
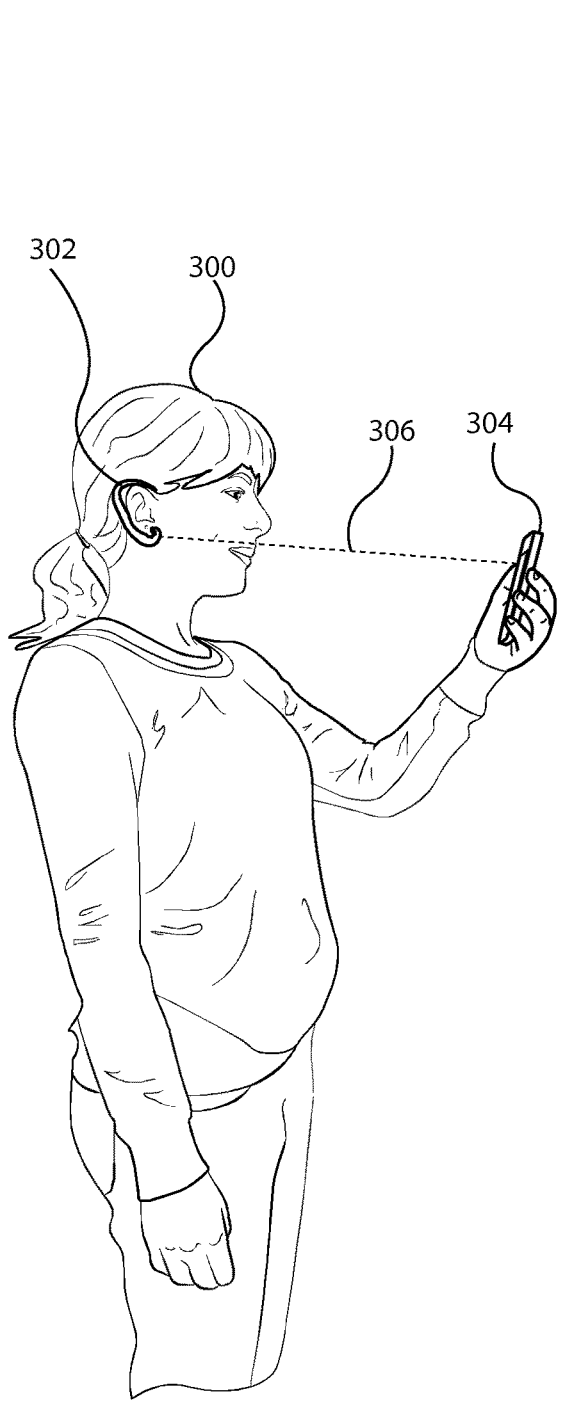
FIGS. 3A-3C are diagrams illustrating an input axis according to at least one example embodiment.
Figure 3B:
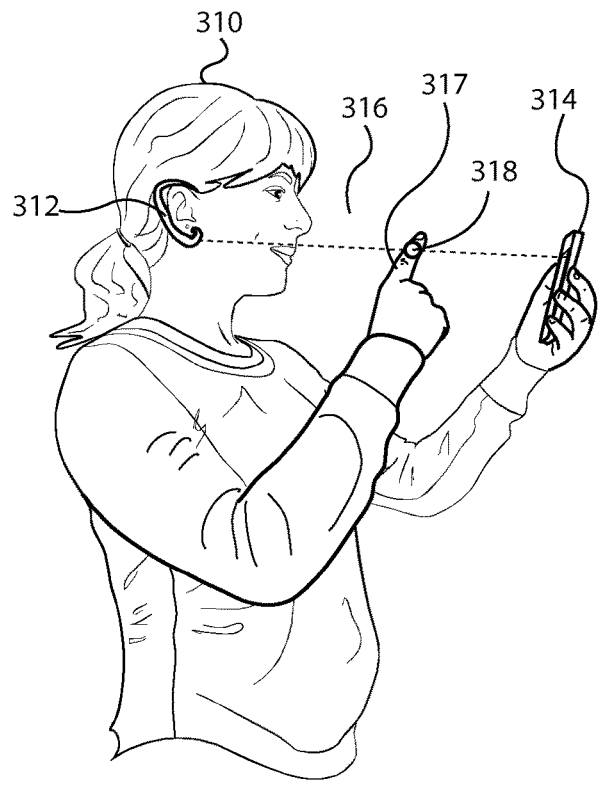
Figure 3C:
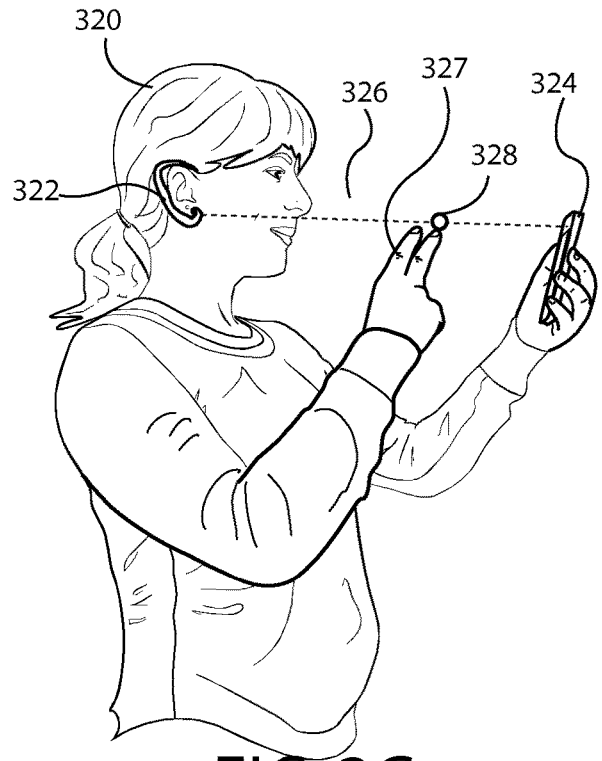

FIGS. 3A-3C are diagrams illustrating an input axis according to at least one example embodiment. The examples of FIGS. 3A-3C are merely examples and do not limit the scope of the claims. For example, apparatus count may vary, input object may vary, input object proximity may vary, input axis position may vary, apparatus configuration may vary, apparatus location may vary, and/or the like.

In many circumstances, a user of an electronic apparatus interacts with the electronic apparatus. For example, the user may listen to music on the electronic apparatus, watch a movie by way of the electronic apparatus, play games on the electronic apparatus, share one or more files with another electronic apparatus by way of the electronic apparatus, and/or the like. In some circumstances, a user interacts with an electronic apparatus by way of a touch sensitive display. In such circumstances, the touch sensitive display is often constrained in size, constrained in granularity of input control, and/or the like. As such, it may be desirable to configure an electronic apparatus such that a user of the electronic apparatus may interact with the electronic apparatus in a manner that allows for an increased granularity of input control, that avoids obscuration of a display of the electronic apparatus by a hand or a finger of the user, and/or the like.

In many circumstances, a user may commonly utilize more than one electronic apparatus simultaneously. For example, the user may utilize an electronic apparatus, for example a phone, a computer, a tablet, etc., and a different electronic apparatus, for example a head mounted apparatus, another phone, a tablet, etc., simultaneously, in conjunction with one another, and/or the like. In such an example, the electronic apparatus and the different electronic apparatus may be operatively connected, the electronic apparatus may be in communication with the different electronic apparatus by way of at least one communication channel, and/or the like. For example, a user of the electronic apparatus may render music by way of the different electronic apparatus. As such, in such circumstances, it may be desirable to configure an electronic apparatus that is associated with another electronic apparatus such that a user of the electronic apparatus may interact with the electronic apparatus in a manner that allows for an increased granularity of input control, that avoids obscuration of a display of the electronic apparatus by a hand or a finger of the user, and/or the like. In at least one example embodiment, an apparatus determines input axis that extends between an apparatus and a separate apparatus. The input axis may be a cross apparatus delineation that extends between a point on the apparatus and a point on the separate apparatus. The point on the apparatus may be a sensor, a camera module, and/or the like. The point on the separate apparatus may be a marker, a tag, and/or the like. As such, the sensor, the camera module, and/or the like of the apparatus may detect, track, etc. the marker, the tag, and/or the like on the separate apparatus.

FIG. 3A is a diagram illustrating an input axis according to at least one example embodiment. In the example of FIG. 3A, user 300 is utilizing apparatus 302 and apparatus 304. As depicted, apparatus 302 is a head mounted apparatus, such as a Bluetooth headset, an ear worn apparatus, and/or the like. As depicted, apparatus 304 is a handheld apparatus, such as a phone, a tablet, a music player, and/or the like. Apparatus 302 and apparatus 304 may be operatively connected, apparatus 302 may be in communication with apparatus 304 by way of at least one communication channel, and/or the like. In the example of FIG. 3A, input axis 306 extends between apparatus 302 and apparatus 304. For example, input axis 306 may extend between a point associated with the location of a camera module comprised by apparatus 302 to a point associated with the location of a visual marker comprised by apparatus 304.

In order to facilitate a user interacting with an electronic apparatus by way of an input axis associated with the electronic apparatus, it may be desirable to detect an input object that is associated with the input axis. In at least one example embodiment, an apparatus receives information indicative of an input object. The input object may be an object that has a predetermined characteristic that indicates that the object is intended to interact with the apparatus by way of the input axis. For example, the input object may be intended to invoke a determination of an operational directive associated with the apparatus, to manipulate one or more parameters associated with the apparatus by way of the operational directive, and/or the like. The operational directive may be similar as described regarding FIGS. 4A-4C, FIGS. 5A-5C, and FIGS. 6A-6B. The predetermined characteristic may be a characteristic that is identifiable by at least one sensor that detects the input object. For example, the characteristic may be a visual characteristic that is identifiable by a camera module, may be a temperature characteristic that is identifiable by an infrared sensor, may be a shape characteristic that is identifiable by a radar sensor, and/or the like. The input object may be a finger, a single finger, two fingers, a hand, an arm, a stylus, a wearable apparatus, and/or the like.

FIG. 3B is a diagram illustrating a user interacting with an apparatus by way of an input axis according to at least one example embodiment. In the example of FIG. 3B, user 310 is utilizing apparatus 312 and apparatus 314. As depicted, apparatus 312 is a head mounted apparatus, such as a Bluetooth headset, an ear worn apparatus, and/or the like. As depicted, apparatus 314 is a handheld apparatus, such as a phone, a tablet, a music player, and/or the like. In the example of FIG. 3B, input axis 316 extends between apparatus 312 and apparatus 314. For example, input axis 316 may extend between a point associated with the location of an infrared sensor comprised by apparatus 312 to a point associated with the location of an infrared marker comprised by apparatus 314. In the example of FIG. 3B, input object 317 is a finger of user 310.

In many circumstances, it may be desirable to infer a user intent to interact with an electronic apparatus by way of an input axis based, at least in part, on an input object being proximate to the input axis. In at least one example embodiment, an apparatus receives information indicative of an input object, the input object being proximate to the input axis. The input object being proximate to the input axis may correspond with the input object being within a threshold distance from the input axis. In at least one example embodiment, the threshold distance is a distance from the input axis within which the input object is determined to be proximate to the input axis. In at least one example embodiment, the threshold distance is based, at least in part, on a detection region of a sensor, a capture region of a camera module, and/or the like. In at least one example embodiment, an apparatus determines that the input object is proximate to the input axis. For example, the apparatus may determine that the input object intersects the input axis, the input object is within a threshold distance of the input axis, the input object is within a detection region of a sensor, the input object is within a capture region of a camera module, and/or the like.

For example, as depicted in the example of FIG. 3A, user 300 is holding apparatus 304 with one hand, and is holding her other hand to her side. As can be seen, there fails to be an input object that is proximate to input axis 306. In the example of FIG. 3B, input object 317, the finger of user 310, intersects input axis 316. As such, in the example of FIG. 3B, apparatus 312 and/or apparatus 314 may receive information indicative of input object 317, may determine that input object 317 is proximate to input axis 316, and/or the like.

In many circumstances, a user may desire to interact with an electronic apparatus by way of an input axis that extends from the electronic apparatus to another electronic apparatus, may desire to interact with the other electronic apparatus by way of the input axis, and/or the like. As such, it may be desirable to allow for quantification of user input that is associated with the input axis. In at least one example embodiment, an apparatus determines an input axis position on the input axis. The determination of the input axis position may be based, at least in part, on the input object, a position of the input object in relation to the input axis, and/or the like. The input axis position may be indicative of a position relative to a distance between the apparatus and the separate apparatus, a percentage of the distance between the apparatus and the separate apparatus, a percentage of the distance from the apparatus to separate apparatus, a percentage of the distance from the separate apparatus to apparatus, and/or the like.

In order to facilitate determination of the input axis position, it may be desirable to determine one or more distances associated with an apparatus, a separate apparatus, an input object, and/or the like. In at least one example embodiment, an apparatus determines a distance between an apparatus and a separate apparatus. In at least one example embodiment, the apparatus determines a distance between an input object and the apparatus. For example, the apparatus may determine a distance from an apparatus to the input object, a distance from the input object to the separate apparatus, and/or the like. As such, the apparatus may determine the input axis position based, at least in part, on the distance between the apparatus and the separate apparatus, the distance between the apparatus and the input object, the distance between the separate apparatus and the input object, and/or the like. For example, as illustrated in the example of FIG. 3B, apparatus 312 and/or apparatus 314 may determine that the distance between apparatus 312 and apparatus 314 is 30 centimeters. As such, the apparatus may determine that input axis 316 approximately 30 centimeters in length based, at least in part, on the determination that the distance between apparatus 312 and apparatus 314 is 30 centimeters. As illustrated, input object 317 is at a position along input axis 316 that is approximately 20 centimeters from apparatus 312 and 10 centimeters from apparatus 314. As such, input axis position 318 may indicate that input object 317 is 20 centimeters from apparatus 312, 10 centimeters from apparatus 314, 66-percent of the distance from apparatus 312 to apparatus 314, 33-percent of the distance from apparatus 314 to apparatus 312, and/or the like.

In many circumstances, it may be desirable to determine an input axis position when the input object is proximate to the input axis, and to preclude determination of an input axis position when the input object fails to be proximate to the input axis. For example, a user of the apparatus may desire to avoid unintentional interaction with the apparatus, to preclude inadvertent input associated with the input axis, and/or the like. In at least one example embodiment, an apparatus determines an input axis position of an input object on the input axis. The determination of the input axis position may be based, at least in part, on the determination that the input object is proximate to the input axis. In some circumstances, the input object may intersect the input axis. As such, the determination of the input axis position on the input axis may comprise determination of the input axis position to be a position on the input axis where the input object intersects the input axis. For example, as illustrated in the example of FIG. 3B, input object 317 intersection input axis 316 at input axis position 318. In such an example, input axis position 318 may be determined based, at least in part, on the position on input axis 316 at which input object 317 intersects input axis 316.

In some circumstances, the input object may be proximate to the input axis, but may fail to intersect the input axis. For example, the input object may be within a threshold distance from the input axis, the input object may be within a detection region of a sensor, the input object may be within a capture region of a camera module, and/or the like. As such, the determination of the input axis position on the input axis may comprise determination of an input object correspondence delineation perpendicular to the input axis. The input object correspondence delineation may intersect at least a part of the input object, and may intersect the input axis at an input axis position. As such, the apparatus may determine the input axis position to be a position on the input axis where the input object correspondence delineation intersects the input axis.

FIG. 3C is a diagram illustrating a user interacting with an apparatus by way of an input axis according to at least one example embodiment. In the example of FIG. 3C, user 320 is utilizing apparatus 322 and apparatus 324. As depicted, apparatus 322 is a head mounted apparatus, such as a Bluetooth headset, an ear worn apparatus, and/or the like. As depicted, apparatus 324 is a handheld apparatus, such as a phone, a tablet, a music player, and/or the like.

In the example of FIG. 3C, input axis 326 extends between apparatus 322 and apparatus 324. For example, input axis 326 may extend between a point associated with the location of a radar sensor comprised by apparatus 322 to a point associated with the location of a radar marker comprised by apparatus 324. In the example of FIG. 3C, input object 327 is two fingers of user 320. As can be seen in the example of FIG. 3C, input object 327 fails to intersect input axis 326. As illustrated, input object 327 is proximate to input axis 326 such that the position of input object 327 is determined to correspond with input axis position 328 on input axis 326. In this manner, apparatus 322 and/or apparatus 324 may have determined input axis position 328 based, at least in part, on an input object correspondence delineation that intersects at least part of input object 327 and perpendicularly intersects input axis 326. For example, the input object correspondence delineation may intersect input object 327 between the two fingers that comprise input object 327, and may perpendicularly intersect input axis 326 and input axis position 328.

As discussed previously, in many circumstances, it may be desirable to preclude determination of an input axis position in circumstances where the input object fails to be proximate to the input axis. For example, a user of the apparatus may desire to avoid unintentional interaction with the apparatus, to preclude inadvertent input associated with the input axis, and/or the like. In at least one example embodiment, an apparatus determines that an input object fails to be proximate to an input axis. For example, the input object may be outside of a threshold distance from the input axis, may be outside of a detection region of a sensor, may be outside of a capture region of a camera module, and/or the like. In such an example embodiment, the apparatus may preclude determination of a position on the input axis based, at least in part, on the determination that the input object fails to be proximate to the input axis.

Figure 4A:
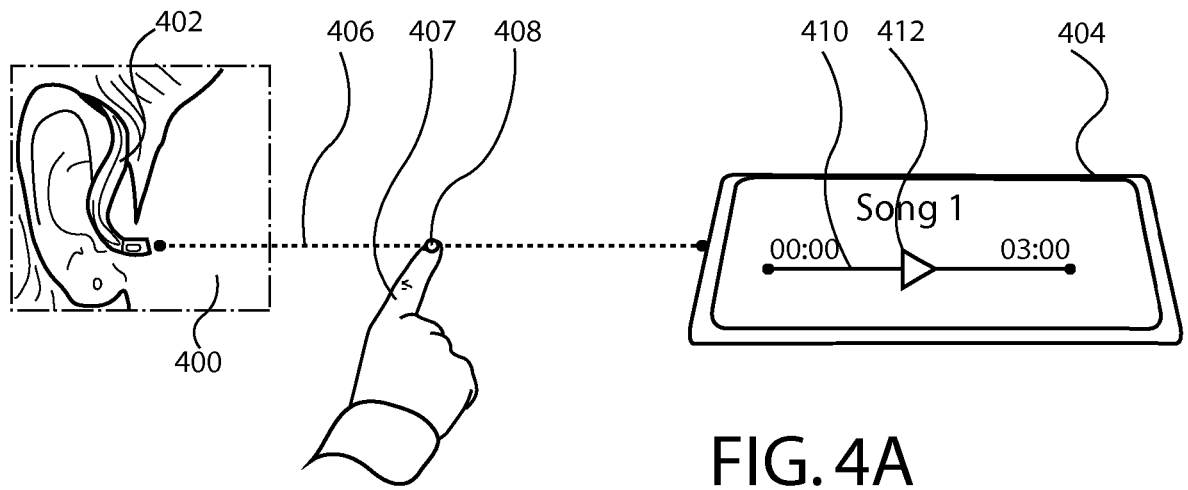
FIGS. 4A-4C are diagrams illustrating a user interacting with an apparatus by way of an input axis according to at least one example embodiment.
Figure 4B:
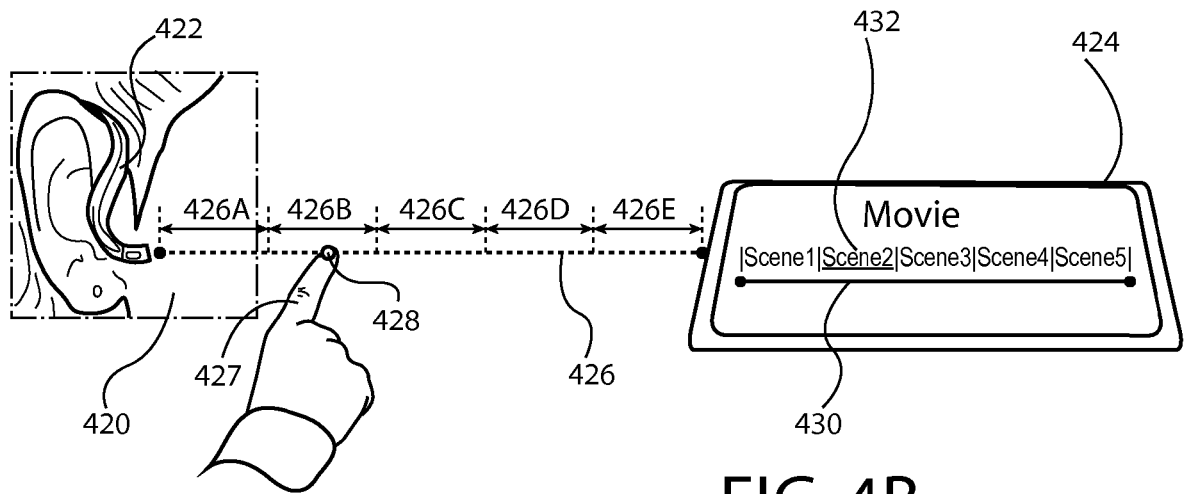
Figure 4C:
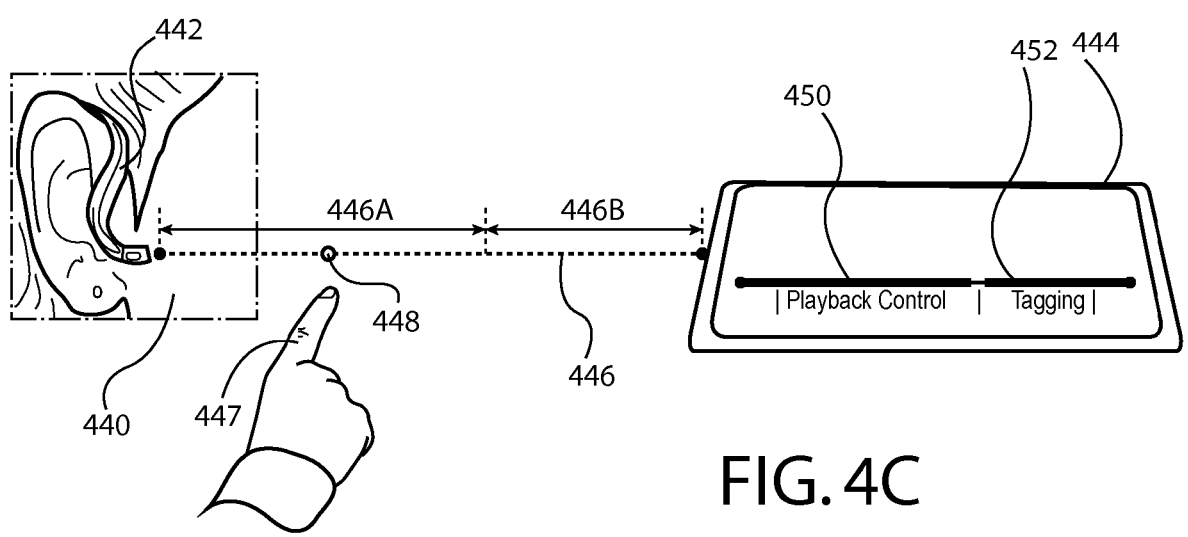

FIGS. 4A-4C are diagrams illustrating a user interacting with an apparatus by way of an input axis according to at least one example embodiment. The examples of FIGS. 4A-4C are merely examples and do not limit the scope of the claims. For example, apparatus count may vary, apparatus configuration may vary, input object may vary, apparatus display content may vary, input axis partitions may vary, input axis segments may vary, input axis configuration may vary, and/or the like.

As discussed previously, in many circumstances, a user of an electronic apparatus may desire to interact with the electronic apparatus by way of an input axis associated with the electronic apparatus, another electronic apparatus, and/or the like. In order to facilitate such interaction, it may be desirable to configure the electronic apparatus such that the electronic apparatus may perform one or more operations based, at least in part, on input received from a user by way of the input axis. For example, the user may desire to scroll through content, may desire to manipulate one or more parameters associated with the apparatus, and/or the like. In at least one example embodiment, an apparatus determines an operational directive based, at least in part, on the input axis position.

It should be understood that determination of an operational directive may be performed in various manners, such as a lookup table, a comparison, and/or the like. For example, the apparatus may determine the operational directive by way of correlation of the input axis position with the operational directive. In such an example, a particular operational directive may be invoked when the apparatus determines an input axis position that corresponds with a specific input axis position, a range of input axis positions, and/or the like. In at least one example embodiment, the apparatus determines the operational directive based, at least in part, on correlation of the input axis position with a predetermined input axis position that is associated with the operational directive. In at least one example embodiment, the apparatus determines the operational directive based, at least in part, on correlation of the input axis position with a predetermined input axis position range that is associated with the operational directive. For example, the input axis position may be within an input axis position threshold from a predetermined input axis position that is associated with an operation directive, may be within a range of input axis positions that is associated with an operational directive, and/or the like.

In many circumstances, the user may desire the electronic apparatus to perform one or more operations in response to the user's input. For example, the user may desire to cause the apparatus to scroll through a list of content, to adjust a parameter associated with the apparatus, and/or the like. As such, it may be desirable to configure an electronic apparatus such that the electronic apparatus performs one or more operations in conformance with the operational directive. In at least one example embodiment, an operational directive is a directive that instructs the apparatus to perform a particular set of operations that are associated with the directive. For example, the operational directive may identify at least one operation of the set of operations, and the apparatus may perform the operation in conformance with the directive. In at least one example embodiment, an apparatus causes performance of one or more operations in conformance with the operational directive. The causation of performance of the operation in conformance with the operational directive may comprise performance of the operation in conformance with the operational directive, sending of the operational directive to a separate apparatus such that the separate apparatus is caused to perform the operation in conformance with the operational directive, and/or the like.

In some circumstances, a user may desire to interact with an electronic apparatus in different manners. For example, the user may desire to utilize the user's hand as an input object, to utilize a stylus as the input object, to utilize a single finger as the input object, to utilize three fingers as the input object, and/or the like. In such circumstances, it may be desirable to determine an operational directive based, at least in part, on the type of the input object, a characteristic of the input object, and/or the like. For example, the user may desire to interact with the apparatus in a particular manner based, at least in part, on the input object utilized by the user. In at least one example embodiment, an apparatus determines an input object classification of an input object. The determination of the input object classification may be based, at least in part, on the received information indicative of the input object. In such an example embodiment, the determination of the operational directive may be based, at least in part, on the input object classification. The input object classification may identify a characteristic of the input object. Such a characteristic of the input object may be a characteristic that is identifiable by way of a sensor, a camera module, and/or the like. The characteristic of the input object may be particularly suited for identification by a specific type of sensor, for example an infrared sensor or a radar sensor, or by a particular type of camera module. The input object classification may be indicative of a finger, a single finger, two fingers, a hand, an arm, a stylus, a wearable apparatus, and/or the like.

In many circumstances, a user may desire to interact with an electronic apparatus in various context associated with utilization of the electronic apparatus. For example, the user may be utilizing the electronic apparatus to play music, to watch a video, to view textual information, and/or the like. In at least one example embodiment, an operational directive corresponds with an operational directive type. In at least one example embodiment, the operational directive type corresponds with a parameter adjustment operational directive that causes a parameter to be set to a value. In such an example embodiment, the value may be based, at least in part, on the input axis position. For example, the input axis may represent a range of values for a specific parameter, and an input axis position associated with the input axis may indicate a particular value within the range of values.

In some circumstances, a user may desire to interact with and/or manipulate playback of audio content by way of an input axis. In at least one example embodiment, a parameter is an audio playback position parameter, and the value indicated by the input axis position is an audio playback position. For example, the user may desire to fast forward through a song, may desire to rewind a song, may desire to select a specific playback position within the song, and/or the like. In such an example, the input axis may correlate with the duration of the song that is being played. As such, a specific input axis position may indicate with a specific audio playback position within the song. For example, an input axis position that is halfway along the input axis may indicate an audio playback position associated with the middle of the song.

In order to facilitate interaction with an electronic apparatus by way of an input axis, a user of the electronic apparatus may desire to perceive information indicative of the input received by the electronic apparatus. For example, the user may desire to perceive confirmation regarding the user's interactions, may desire to perceive manipulation of content displayed on a display comprised by the electronic apparatus, and/or the like. In at least one example embodiment, an apparatus causes display of a slider interface element. For example, the apparatus may display the slider interface element, may cause a separate apparatus to display the slider interface element, and/or the like. In such an example embodiment, an operational directive may cause setting of a slider interface element selection point to correspond with the input axis position. For example, the apparatus may cause display of a slider interface element selection point in relation to the slider interface element. In such an example, the slider interface element may be associated with a parameter, and the slider interface element selection point may be associated with a value of the parameter. For example, the slider interface element selection point may be indicative of the value of the parameter, may be displayed at a position along the slider interface element based, at least in part, on the value of the parameter, may be displayed at a position along the slider interface element that is indicative of the value of the parameter, and/or the like.

FIG. 4A is a diagram illustrating a user interacting with an apparatus by way of an input axis according to at least one example embodiment. In the example of FIG. 4A, user 400 is utilizing apparatus 402 and apparatus 404. In the example of FIG. 4A, apparatus 402 is a head mounted apparatus and apparatus 404 is a phone, a tablet, a music player, and/or the like. As can be seen, input object 407 is a finger of user 400. Input object 407 intersects input axis 406 at input axis position 408. As can be seen, in the example of FIG. 4A, apparatus 404 is playing a song entitled "Song 1." In the example of FIG. 4A, apparatus 404 is displaying slider interface element selection point 412 in relation to slider interface element 410. In the example of FIG. 4A, input axis 406 and slider interface element 410 each correspond to a duration of the song "Song 1." For example, as can be seen, "Song 1" is 3:00 in length. In the example of FIG. 4A, input axis position 408 is approximately halfway between apparatus 402 and apparatus 404. As such, input axis position 408 may indicate an audio playback position that is approximately in the middle of "Song 1," or approximately 1:30 into the song. As such, slider interface element selection point 412 is displayed approximately in the middle of slider interface element 410. In this manner, slider interface element 410 and slider interface element selection point 412 indicate that the playback position within "Song 1" is approximately at the middle of the song, or approximately 1:30 into the song. In this manner, the value of the audio playback position parameter may be set based, at least in part, on input axis position 408 and the associated operational directive.

In some circumstances, a user may desire to select specific audio content by way of an input axis. In at least one example embodiment, a parameter is an audio item parameter, and the value indicated by the input axis position is indicative of an audio item. For example, the user may interact with a playlist of songs by way of the input axis. As such, the user may scroll through the playlist by way of the input axis, may select a specific song by way of the input axis, and/or the like. As such, a specific input axis position may indicate a specific song that the user desires to cause rendering of by way of the apparatus, a separate apparatus, and/or the like.

In some circumstances, a user may desire to interact with one or more interface element associated with an electronic apparatus. For example, the user may desire to play a game by way of the electronic apparatus, to interact with an application that is associated with the electronic apparatus, and/or the like. In such an example, the user may interact with and/or manipulate one or more interface elements associated with a game, an application, and or the like. In at least one example embodiment, a parameter is a game input position parameter, and the value indicated by the input axis position is a game input position. For example, the game may be associated with a sling-shot mechanism, and the input axis position may indicate a position of the sling. For example, an input axis position that is closer to a separate apparatus may indicate a lesser straining of the sling, an input axis position that is further from the separate apparatus may indicate a greater straining of the sling, and/or the like. In at least one example embodiment, a parameter is an instrument playback parameter, and the value indicated by the input axis position is a pitch associated with playing of the instrument. For example, the instrument may be a harp, and the input axis position may indicate playing of a particular string associated with the harp. For example, an input axis position that is closer to a separate apparatus may indicate a pitch associated with a shorter string of the harp, an input axis position that is further from the separate apparatus may indicate a pitch associated with a longer string of the harp, and/or the like.

In some circumstances, a user may desire to control one or more additional parameters associated with an electronic apparatus. For example, the user may desire to increase an output volume associated with playback of auditory information, may desire to decrease an input volume associated with auditory information received from a microphone, and/or the like. In at least one example embodiment, a parameter is an output volume parameter, and the value indicated by the input axis position is an output volume. For example, an input axis position that is closer to a separate apparatus may indicate a higher output volume, an input axis position that is further from the separate apparatus may indicate a lower output volume, and/or the like. In at least one example, a parameter is an input volume parameter, and the value indicated by the input axis position is an input volume. The input volume may be associated with amplification of auditory information received from at least one microphone, gain associated with the auditory information received from the microphone, and/or the like. For example, an input axis position that is closer to a separate apparatus may indicate a higher input volume, an input axis position that is further from the separate apparatus may indicate a lower input volume, and/or the like. In at least one example embodiment, a parameter is a tag parameter, and the value indicated by the input axis position is indicative of a tag. A tag may be an identifying indicator, characteristic, descriptor, and/or the like. For example, a user may desire to tag a specific song as a favorite, tag a different song as a song by a particular artist, and/or the like. As such, various positions along the input axis may correspond with various tags. In this manner, receipt of an input at an input axis position may indicate a user's desire to select the tag that corresponds with the input axis position.

In some circumstances, a user may desire to interact with and/or manipulate playback of video content by way of an input axis. In at least one example embodiment, a parameter is a video playback position parameter, and the value indicated by the input axis position is a video playback position. For example, the user may desire to fast forward through a video, may desire to rewind a video, may desire to select a specific playback position within the video, and/or the like. In such an example, the input axis may correlate with the duration of the video that is being played. As such, a specific input axis position may indicate a specific video playback position within the video. For example, an input axis position that is halfway along the input axis may indicate a video playback position associated with the middle of the video.

In some circumstances, a user may desire to interact with and/or manipulate playback of video content by way of an input axis. In at least one example embodiment, a parameter is a video scene parameter, and the value indicated by the input axis position is indicative of a video scene. For example, the user may desire to cause playback of a particular scene associated with the video, may desire to replay a particular scene associate with the video, may desire to skip ahead within the video and being watching a scene further into the video, and/or the like. In such an example, the input axis position may correspond with an input axis segment. As such, the determination of the operational directive may be based, at least in part, on the input axis segment. In at least one example embodiment, an input axis segment identifies a range of input axis positions that correspond with a particular operational directive. As such, an input axis position may correspond with an input axis segment that is associated with a scene of a video, and a different input axis position may correspond with a different input axis segment that is associated with a different scene of the video. In this manner, the input received at the input axis position may cause rendering of the scene of the video, and the different input received at the different input axis position may cause rendering of the different scene of the video. For example, the apparatus may render the scene of the video, the apparatus may cause a separate apparatus to cause rendering of the scene of the video, and/or the like.

For example, an input axis position may correspond with an input axis segment and a different input axis position may correspond with a different input axis segment. In such an example, the determination of the operational directive may be based, at least in part, on the input axis segment. Similarly, the determination of the different operational directive may be based, at least in part, on the different input axis segment. In another example, an input axis position may correspond with an input axis segment and a different input axis position may correspond with the input axis segment. In such an example, the determination of the operational directive may be based, at least in part, on the input axis segment. Similarly, the determination of the different operational directive may be based, at least in part, on the input axis segment.

In order to permit a user to distinguish between input axis segments, it may be desirable to provide the user with feedback that indicates that a specific input axis position is associated with an input axis segment, the input object has transitioned from an input axis segment to a different input axis segment, and/or the like. In at least one example embodiment, an apparatus provides feedback when transitioning from an input axis segment to a different input axis segment. For example, the apparatus may provide auditory feedback, tactile feedback, visual feedback, and/or the like. For example, the apparatus may cause playing of auditory information when an input object transitions from an input axis segment to a different input axis segment, cause physical rendering of tactile information when an input object transitions from an input axis segment to a different input axis segment, and/or the like.

FIG. 4B is a diagram illustrating a user interacting with an apparatus by way of an input axis according to at least one example embodiment. In the example of FIG. 4B, user 420 is utilizing apparatus 422 and apparatus 424. In the example of FIG. 4B, apparatus 422 is a head mounted apparatus and apparatus 424 is a phone, a tablet, a music player, and/or the like. As can be seen, input object 427 is a finger of user 420. Input object 427 intersects input axis 426 at input axis position 428. As can be seen, in the example of FIG. 4B, apparatus 424 is playing a video entitled "Movie." In the example of FIG. 4B, apparatus 424 is displaying slider interface element selection point 432 in relation to slider interface element 430. In the example of FIG. 4B, input axis 426 is associated with input axis segments 426A, 426B, 426C, 426D, and 426E. In the example of FIG. 4B, the video is associated with at least five specific scenes, "Scene 1," "Scene 2," "Scene 3," "Scene 4," and "Scene 5." In the example of FIG. 4B, input axis segment 426A corresponds with "Scene 1," input axis segment 426B corresponds with "Scene 2," input axis segment 426C corresponds with "Scene 3," input axis segment 426D corresponds with "Scene 4," and input axis segment 426E corresponds with "Scene 5."

In the example of FIG. 4B, input axis 426 and slider interface element 430 each correlate with a range of scenes associated with the video. In the example of FIG. 4B, input axis position 428 corresponds with input axis segment 426B. As such, input axis position 428 may indicate selection of the video scene that corresponds with input axis segment 426B. In this manner, input axis position 428 may indicate selection of "Scene 2" of the video. In this manner, slider interface element 430 and slider interface element selection point 432 indicate that the selected scene associated with "Movie" is "Scene 2." In this manner, the value of the video scene parameter may be set based, at least in part, on input axis position 428 and the associated operational directive. For example, the video scene parameter may be set to a value that is indicative of "Scene 2," as indicated by slider interface element selection point 432.

In some circumstances, it may be desirable to allow for more than one type of interaction to be performed by way of an input axis. For example, it may be desirable to configure an electronic apparatus such that the electronic apparatus may distinguish between portions of an input axis, may set a specific parameter based, at least in part, on an input axis position corresponding with a particular portion of the input axis, and/or the like. In such an example, the input axis position may correspond with an input axis partition. As such, the determination of the operational directive may be based, at least in part, on the input axis partition. In at least one example embodiment, an input axis partition identifies a range of input axis positions that correspond with a particular operational directive, with a particular type of operational directive, with a particular parameter, and/or the like. As such, an input axis position may correspond with an input axis partition that is associated with an audio playback position parameter, and a different input axis position may correspond with a different input axis partition that is associated with an output volume parameter. In this manner, the input received at the input axis position may cause setting of the audio playback position parameter to a value indicated by the input axis position, and the different input received at the different input axis position may cause setting of the output volume parameter to a value indicated by the different input axis position.

For example, an input axis position may correspond with an input axis partition and a different input axis position may correspond with a different input axis partition. In such an example, the determination of the operational directive may be based, at least in part, on the input axis partition. Similarly, the determination of the different operational directive may be based, at least in part, on the different input axis partition. In another example, an input axis position may correspond with an input axis partition and a different input axis position may correspond with the input axis partition. In such an example, the determination of the operational directive may be based, at least in part, on the input axis partition. Similarly, the determination of the different operational directive may be based, at least in part, on the input axis partition.

In order to permit a user to distinguish between input axis partitions, it may be desirable to provide the user with feedback that indicates that a specific input axis position is associated with an input axis partition, the input object has transitioned from an input axis partition to a different input axis partition, and/or the like. In at least one example embodiment, an apparatus provides feedback when transitioning from an input axis partition to a different input axis partition. For example, the apparatus may provide auditory feedback, tactile feedback, visual feedback, and/or the like. For example, the apparatus may cause playing of auditory information when an input object transitions from an input axis partition to a different input axis partition, cause physical rendering of tactile information when an input object transitions from an input axis partition to a different input axis partition, and/or the like.

FIG. 4C is a diagram illustrating a user interacting with an apparatus by way of an input axis according to at least one example embodiment. In the example of FIG. 4C, user 440 is utilizing apparatus 442 and apparatus 444. In the example of FIG. 4C, apparatus 442 is a head mounted apparatus and apparatus 444 is a phone, a tablet, a music player, and/or the like. As can be seen, input object 447 is a finger of user 440. In the example of FIG. 4C, input object 447 fails to intersect input axis 446. In the example of FIG. 4C, input axis position 448 corresponds with a position associated with the perpendicular intersection of an input object correspondence delineation that intersects, at least a part of, input object 447. In the example of FIG. 4C, apparatus 444 is displaying slider interface element 450 and slider interface element 452. In the example of FIG. 4C, input axis 446 is associated with input axis partition 446A and input axis partition 446B. In the example of FIG. 4C, slider interface element 450 is associated with "Playback Control," or an audio playback position parameter, video playback position parameter, and/or the like. In the example of FIG. 4C, slider interface element 452 is associated with "Tagging," or a tag parameter. In the example of FIG. 4C, input axis partition 446A corresponds with "Playback Control," or the audio playback position parameter, the video playback position parameter, and/or the like, and input axis partition 446B corresponds with "Tagging," or the tag parameter.

In the example of FIG. 4C, input axis partition 446A and slider interface element 450 each correlate with a range of values associated with the audio playback position parameter. As such, an input at an input axis position within index axis partition 446A may cause setting of the audio playback position parameter to a particular value based, at least in part, on the input axis position, cause setting of the video playback position parameter to a particular value based, at least in part, on the input axis position, and/or the like. In the example of FIG. 4C, input axis partition 446B and slider interface element 452 each correlate with a range of values associated with the tag parameter. As such, an input at an input axis position within index axis partition 446B may cause setting of the tag parameter to a particular value based, at least in part, on the input axis position.

In the example of FIG. 4C, input axis position 448 corresponds with input axis partition 446A. In the example of FIG. 4C, input axis position 448 is approximately in the middle of input axis partition 446A. As such, input axis position 448 may indicate an audio playback position that is approximately in the middle of an associated song, video, movie, and/or the like. In this manner, the value of the audio playback position parameter, the video playback position parameter, and/or the like, may be set based, at least in part, on input axis position 448 and the associated operational directive.

In many circumstances, users of electronic apparatuses have grown accustomed to certain types of input gestures. For example, many users may be familiar with a swipe gesture, a dragging gesture, a scrolling gesture, and/or the like. As such, it may be desirable to configure an electronic apparatus such that the electronic apparatus may receive information indicative of movement of an input object, may determine that an input object has moved to a different position that corresponds with a different input axis position, and/or the like. In at least one example embodiment, an apparatus receives information indicative of movement of an input object. In such an example embodiment, the apparatus may determine that the input object remains proximate to the input axis while the input object is in motion, after the input object movement has ceased, and/or the like. For example, the apparatus may determine that the input object remains within the threshold distance from the input axis, may determine that the input object movement ceases at a position that is within the threshold distance from the input axis, and/or the like. In such an example embodiment, the apparatus may determine a different input axis position on the input axis based, at least in part, on the input object. As such, the apparatus may determine a different operational directive that is based, at least in part, on the different input axis position.

For example, as depicted in the example of FIG. 4A, input object 407 may move from a position corresponding with input axis position 408 to a position that corresponds with the end of the input axis closest to apparatus 402. In such an example embodiment, apparatus 402 and/or apparatus 404 may determine that input object 407 has moved, may determine that input object 407 has moved to a different input axis position, and may determine a different operational directive based, at least in part, on the different input axis position. In this manner, movement of input object 407 to the different input axis position may cause rewinding of "Song 1" such that an audio playback position parameter associated with the playback of "Song 1" is set to a value that indicates a playback position of 0:00. In effect, the movement of input object 407 to the different position at the end of input axis 406 closest to apparatus 402 may cause "Song 1" to replay from the beginning of the song.

Figure 5A:
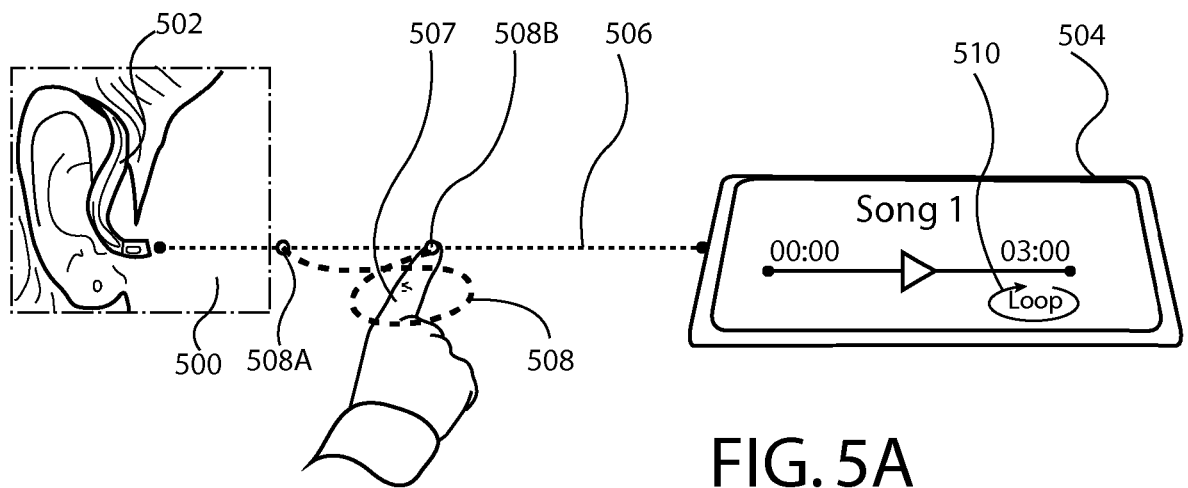
FIGS. 5A-5C are diagrams illustrating a user interacting with an apparatus by way of an input axis according to at least one example embodiment.
Figure 5B:
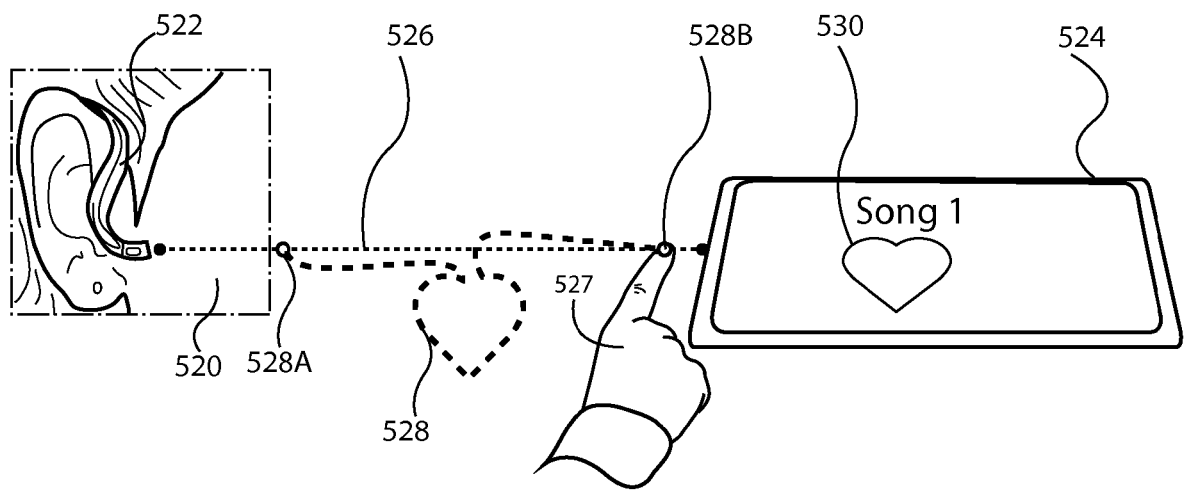
Figure 5C:
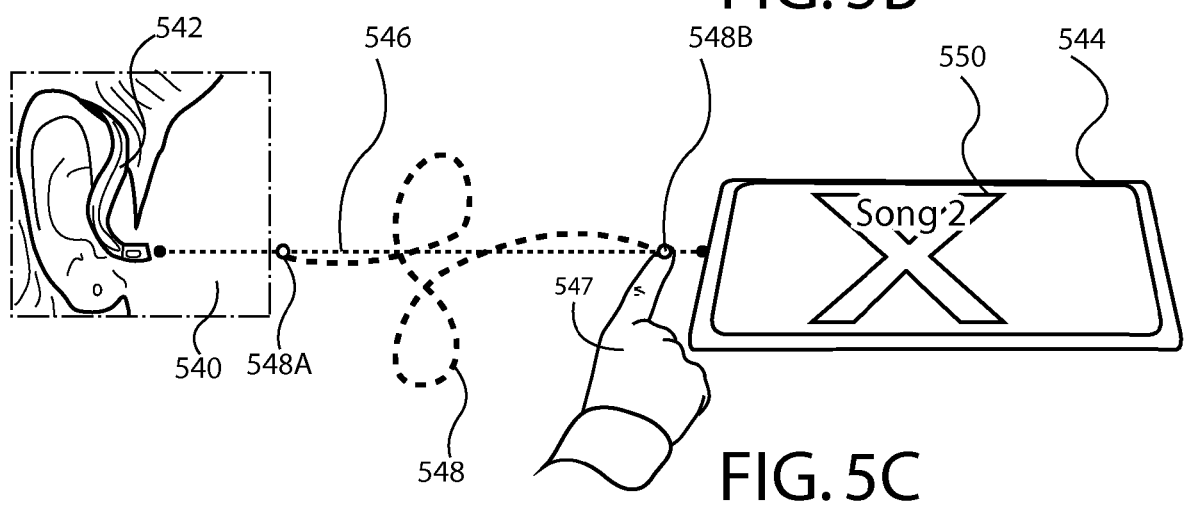

FIGS. 5A-5C are diagrams illustrating a user interacting with an apparatus by way of an input axis according to at least one example embodiment. The examples of FIGS. 5A-5C are merely examples and do not limit the scope of the claims. For example, apparatus count may vary, apparatus configuration may vary, input object may vary, input object movement may vary, apparatus display content may vary, input axis partitions may vary, input axis segments may vary, input axis configuration may vary, and/or the like.

As discussed previously, many users of electronic apparatuses have grown accustomed to certain types of input gestures. For example, many users may be familiar with a swipe gesture, a dragging gesture, a scrolling gesture, and/or the like. In some circumstances, it may be desirable to configure an electronic apparatus such that the electronic apparatus may receive information indicative of an input object performing a gesture. For example, the input object may perform a specific gesture while remaining proximate to the input axis, and the apparatus may determine the gesture based, at least in part, on an input axis position, a different input axis position, information indicative of movement of the input object, and/or the like. In at least one example embodiment, a gesture corresponds with a predetermined movement pattern of an input object. For example, a gesture may correspond with movement of an input object such that the input object traces a predetermined path, such that the input object is moved in conformance with a predetermined gesture, and/or the like. A gesture may be associated with movement of the input object parallel to an input axis, perpendicular to the input axis, and/or the like. In at least one example embodiment, an apparatus receives information indicative of a gesture performed by way of an input object. In such an example embodiment, the apparatus may determine an operational directive based, at least in part, on the gesture.

FIG. 5A is a diagram illustrating a user interacting with an apparatus by way of an input axis according to at least one example embodiment. In the example of FIG. 5A, user 500 is utilizing apparatus 502 and apparatus 504. In the example of FIG. 5A, apparatus 502 is a head mounted apparatus and apparatus 504 is a phone, a tablet, a music player, and/or the like. As can be seen, in the example of FIG. 5A, apparatus 504 is playing a song entitled "Song 1." As can be seen, input object 507 is a finger of user 500. In some circumstances, user 500 may desire to cause "Song 1" to play repeatedly, to play more than once, and/or the like. As such, user 500 may desire to cause "Song 1" to "Loop" by moving input object 507 in conformance with gesture 508. Gesture 508 may be associated with an operational directive that causes performance of one or more operations associated with looping of "Song 1," repeatedly playing "Song 1," and/or the like. As can be seen, gesture 508 begins at input axis position 508A and terminates at input axis position 508B. In at least one example embodiment, an apparatus determines at least one input axis position associated with the input object moving in conformance with the gesture. In the example of FIG. 5A, gesture 508 is a loop gesture that is associated with an operational directive that causes performance of one or more operations associated with looping of "Song 1," repeatedly playing "Song 1," and/or the like. As can be seen, indicator 510 indicates that apparatus 504 determined an operational directive based, at least in part, on gesture 508, and performed one or more operations associated with looping of "Song 1," repeatedly playing "Song 1," and/or the like.

FIG. 5B is a diagram illustrating a user interacting with an apparatus by way of an input axis according to at least one example embodiment. In the example of FIG. 5B, user 520 is utilizing apparatus 522 and apparatus 524. In the example of FIG. 5B, apparatus 522 is a head mounted apparatus and apparatus 524 is a phone, a tablet, a music player, and/or the like. As can be seen, in the example of FIG. 5B, apparatus 524 is playing a song entitled "Song 1." As can be seen, input object 527 is a finger of user 520. As previously discussed, in some circumstances, a user may desire to associate specific content with a particular tag. It may be desirable to configure an apparatus such that a user may interact with the apparatus in a manner that is easy and intuitive for the user. For example, user 520 may enjoy listening to "Song 1," and may desire to tag the song as a favorite by performing a gesture in relation to input axis 526. As can be seen, in the example of FIG. 5B, gesture 528 is associated with movement of input object 527 such that input object 527 begins movement at a position that corresponds with input axis position 528A, moves such that input object 527 traces the outline of a heart, and terminates movement at a position that corresponds with input axis position 528B. As such, gesture 528 is a heart gesture that is associated with an operational directive that causes performance of one or more operations associated with adding "Song 1" to a favorites list, tagging "Song 1" as a favorite, and/or the like. For example, apparatus 524 may cause playing of "Song 1" more often based, at least in part, on gesture 528. As can be seen, indicator 530 indicates that apparatus 524 determined an operational directive based, at least in part, on gesture 528, and performed one or more operations associated with adding "Song 1" to a favorites list, tagging "Song 1" as a favorite, and/or the like.

FIG. 5C is a diagram illustrating a user interacting with an apparatus by way of an input axis according to at least one example embodiment. In the example of FIG. 5C, user 540 is utilizing apparatus 542 and apparatus 544. In the example of FIG. 5C, apparatus 542 is a head mounted apparatus and apparatus 544 is a phone, a tablet, a music player, and/or the like. As can be seen, in the example of FIG. 5C, apparatus 544 is playing a song entitled "Song 2." As can be seen, input object 547 is a finger of user 540. As previously discussed, in some circumstances, a user may desire to associate specific content with a particular tag. For example, user 540 may not enjoy listening to "Song 2," and may desire to tag the song as a disliked song by performing a gesture in relation to input axis 546. As can be seen, in the example of FIG. 5C, gesture 548 is associated with movement of input object 547 such that input object 547 begins movement at a position that corresponds with input axis position 548A, moves such that input object 547 traces the shape of an X, and terminates movement at a position that corresponds with input axis position 548B. As such, gesture 548 is a dislike gesture that is associated with an operational directive that causes performance of one or more operations associated with adding "Song 2" to a disliked song list, tagging "Song 2" as a disliked song, and/or the like. For example, apparatus 544 may preclude playing of "Song 2" based, at least in part, on gesture 548. As can be seen, indicator 550 indicates that apparatus 544 determined an operational directive based, at least in part, on gesture 548, and performed one or more operations associated with adding "Song 2" to a disliked song list, tagging "Song 2" as a disliked song, and/or the like.

Figure 6A:
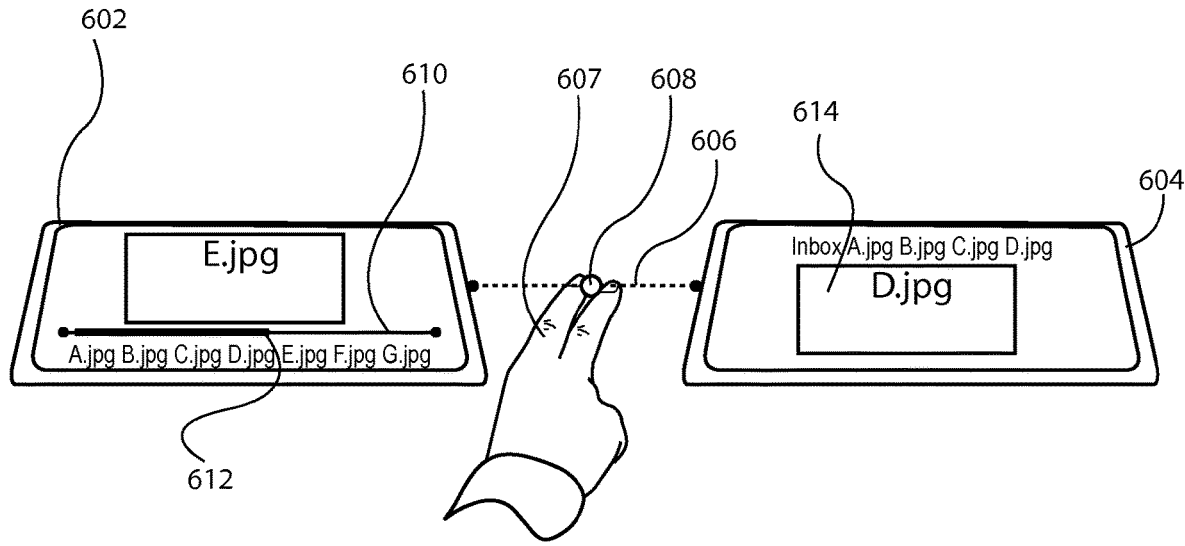
FIGS. 6A-6B are diagrams illustrating a user interacting with an apparatus by way of an input axis according to at least one example embodiment.
Figure 6B:
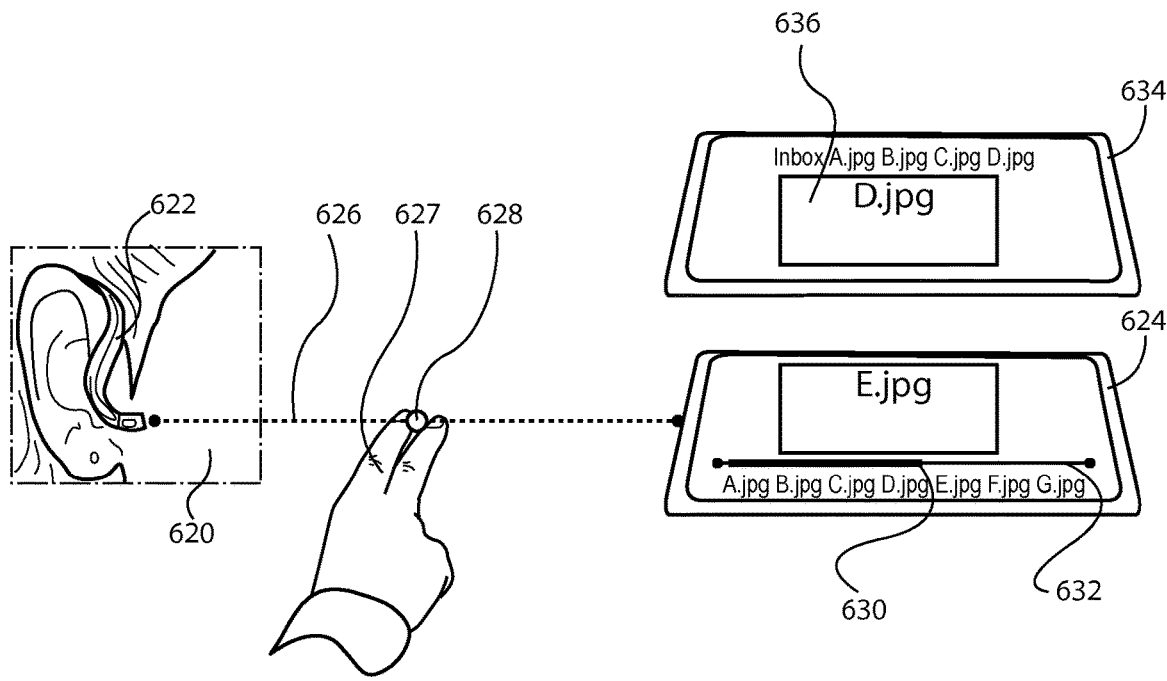

FIGS. 6A-6B are diagrams illustrating a user interacting with an apparatus by way of an input axis according to at least one example embodiment. The examples of FIGS. 6A-6B are merely examples and do not limit the scope of the claims. For example, apparatus count may vary, apparatus configuration may vary, input object may vary, apparatus display content may vary, input axis partitions may vary, input axis segments may vary, input axis configuration may vary, and/or the like.

In many circumstances, a user may desire to cause transference of files, information, etc. from one apparatus to a separate apparatus. In such circumstances, it may be desirable to configure an apparatus such that the user of the apparatus may indicate such a desire in a manner that is easy and intuitive. In at least one example embodiment, an input axis is associated with one or more files that a user may desire to cause transference of to a separate apparatus. In such an example embodiment, a specific position along the input axis may indicate selection of a particular file to transfer, may indicate selection of a range of files to transfer, and/or the like. For example, an input object may begin at a position associated with an input axis position and subsequently move to a different position associated with a different input axis position. In such an example embodiment, the movement of the input object from the input axis position to the different input axis position may indicate a selection of a portion of the files associated with input axis positions between the input axis position and the different input axis position, a selection of all of the files associated with input axis positions between the input axis position and the different input axis position, and/or the like. In such circumstances, an apparatus may determine that an operational directive is a file transfer operational directive. As such, the apparatus may cause transfer of one or more files from an apparatus to a separate apparatus, from the apparatus to a different separate apparatus, from the separate apparatus to the different separate apparatus, and/or the like, in conformance with the operational directive.

FIG. 6A is a diagram illustrating a user interacting with an apparatus by way of an input axis according to at least one example embodiment. In the example of FIG. 6A, a user is utilizing apparatus 602 and apparatus 604. In the example of FIG. 6A, each of apparatus 602 and apparatus 604 is a phone, a tablet, a music player, and/or the like. As can be seen, in the example of FIG. 6A, apparatus 602 is displaying slider interface element selection point 612 in relation to slider interface element 610. In the example of FIG. 6A, the user of apparatus 602 and 604 may desire to cause transfer of one or more files from apparatus 602 to apparatus 604. In the example of FIG. 6A, input axis 606 is associated with the list of files indicated by slider interface element 610. In the example of FIG. 6A, a user of apparatus 602 and apparatus 604 positions input object 607, for example two fingers of the user, at input axis position 608. Input axis position 608 is approximately at the midpoint between apparatus 602 and apparatus 604 along input axis 606. As such, input axis may indicate selection of the file "D.jpg," selection of the first half of the files, selection of the second half of the files, and/or the like. In the example of FIG. 6A, input object 607 may have been positioned at a position that corresponds with the end of input axis 606 closest to apparatus 602, and subsequently moved to position 608. As such, all files that correspond with the first half of input axis 606 may have been selected for transfer to apparatus 604, may have been transferred to apparatus 604, and/or the like. As such, in the example of FIG. 6A, slider interface element selection point 612 indicates selection of files "A.jpg," "B.jpg," C.jpg," and "D.jpg," transference of files "A.jpg," "B.jpg," C.jpg," and "D.jpg," and/or the like. As can be seen, apparatus 604 is caused to display a representation of the files selected by way of input axis 606, the files transferred to apparatus 604 from apparatus 602, and/or the like. As such, in the example of FIG. 6A, apparatus 604 is caused to display a representation 614 associated with "D.jpg," and lists that files "A.jpg," "B.jpg," C.jpg," and "Djpg" are in an "Inbox" associated with apparatus 604.

FIG. 6B is a diagram illustrating a user interacting with an apparatus by way of an input axis according to at least one example embodiment. In the example of FIG. 6B, a user is utilizing apparatus 622 and apparatus 624. The user or a different user may be utilizing apparatus 634. In the example of FIG. 6B, apparatus 622 is a head mounted apparatus, a Bluetooth headset, and/or the like. In the example of FIG. 6B, each of apparatus 624 and apparatus 634 is a phone, a tablet, a music player, and/or the like. As can be seen, in the example of FIG. 6B, apparatus 624 is displaying slider interface element selection point 630 in relation to slider interface element 632. In the example of FIG. 6B, the user of apparatus 622 and 624 may desire to cause transfer of one or more files from apparatus 624 to apparatus 634. In the example of FIG. 6B, input axis 626 is associated with the list of files indicated by slider interface element 632. In the example of FIG. 6B, user 620 of apparatus 622 and apparatus 624 positions input object 627, in this example, two fingers of user 620, at input axis position 628. Input axis position 628 is approximately at the midpoint between apparatus 622 and apparatus 624 along input axis 626. As such, input axis may indicate selection of the file "D.jpg," selection of the first half of the files, selection of the second half of the files, and/or the like. In the example of FIG. 6B, input object 627 may have been positioned at a position that corresponds with the end of input axis 626 closest to apparatus 622, and subsequently moved to position 628. As such, all files that correspond with the first half of input axis 626 may have been selected for transfer from apparatus 624 to apparatus 634, may have been transferred from apparatus 624 to apparatus 634, and/or the like. As such, in the example of FIG. 6B, slider interface element selection point 630 indicates selection of files "A.jpg," "Bjpg," C.jpg," and "D.jpg," transference of files "A.jpg," "Bjpg," Cjpg," and "D.jpg," and/or the like. As can be seen, apparatus 634 is caused to display a representation of the files selected by way of input axis 626, the files transferred to apparatus 634 from apparatus 624, and/or the like. As such, in the example of FIG. 6B, apparatus 634 is caused to display a representation 636 associated with "D.jpg," and lists that files "A.jpg," "B.jpg," C.jpg," and "D.jpg" are in an "Inbox" associated with apparatus 634.

Figure 7:
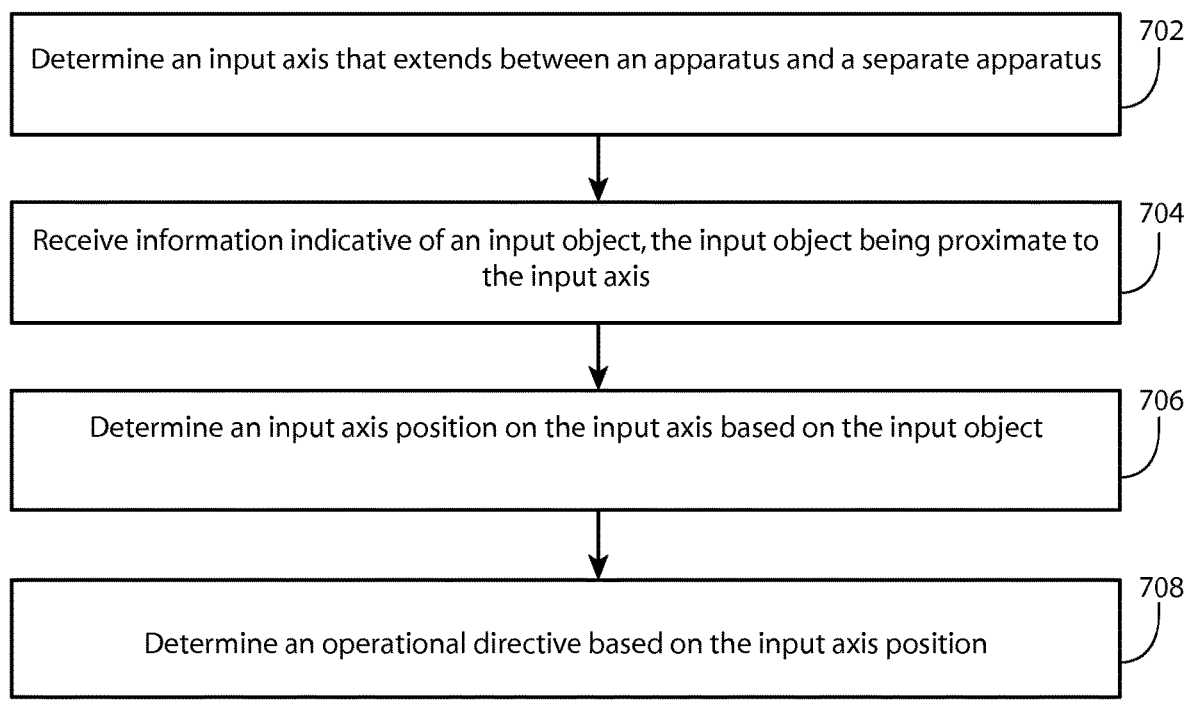
FIG. 7 is a flow diagram illustrating activities associated with determination of an operational directive based, at least in part, on an input axis position according to at least one example embodiment.

FIG. 7 is a flow diagram illustrating activities associated with determination of an operational directive based, at least in part, on an input axis position according to at least one example embodiment. In at least one example embodiment, there is a set of operations that corresponds with the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 7.

At block 702, the apparatus determines an input axis that extends between an apparatus and a separate apparatus. The determination, the input axis, the apparatus, and the separate apparatus may be similar as described regarding FIGS. 3A-3C.

At block 704, the apparatus receives information indicative of an input object, the input object being proximate to the input axis. The receipt, the input object, and the input object being proximate to the input axis may be similar as described regarding FIGS. 3A-3C.

At block 706, the apparatus determines an input axis position on the input axis based, at least in part, on the input object. The determination and the input axis position may be similar as described regarding FIGS. 3A-3C, FIGS. 4A-4C, FIGS. 5A-5C, and FIGS. 6A-6B.

At block 708, the apparatus determines an operational directive based, at least in part, on the input axis position. The determination and the operational directive may be similar as described regarding FIGS. 3A-3C, FIGS. 4A-4C, FIGS. 5A-5C, and FIGS. 6A-6B.

Figure 8:
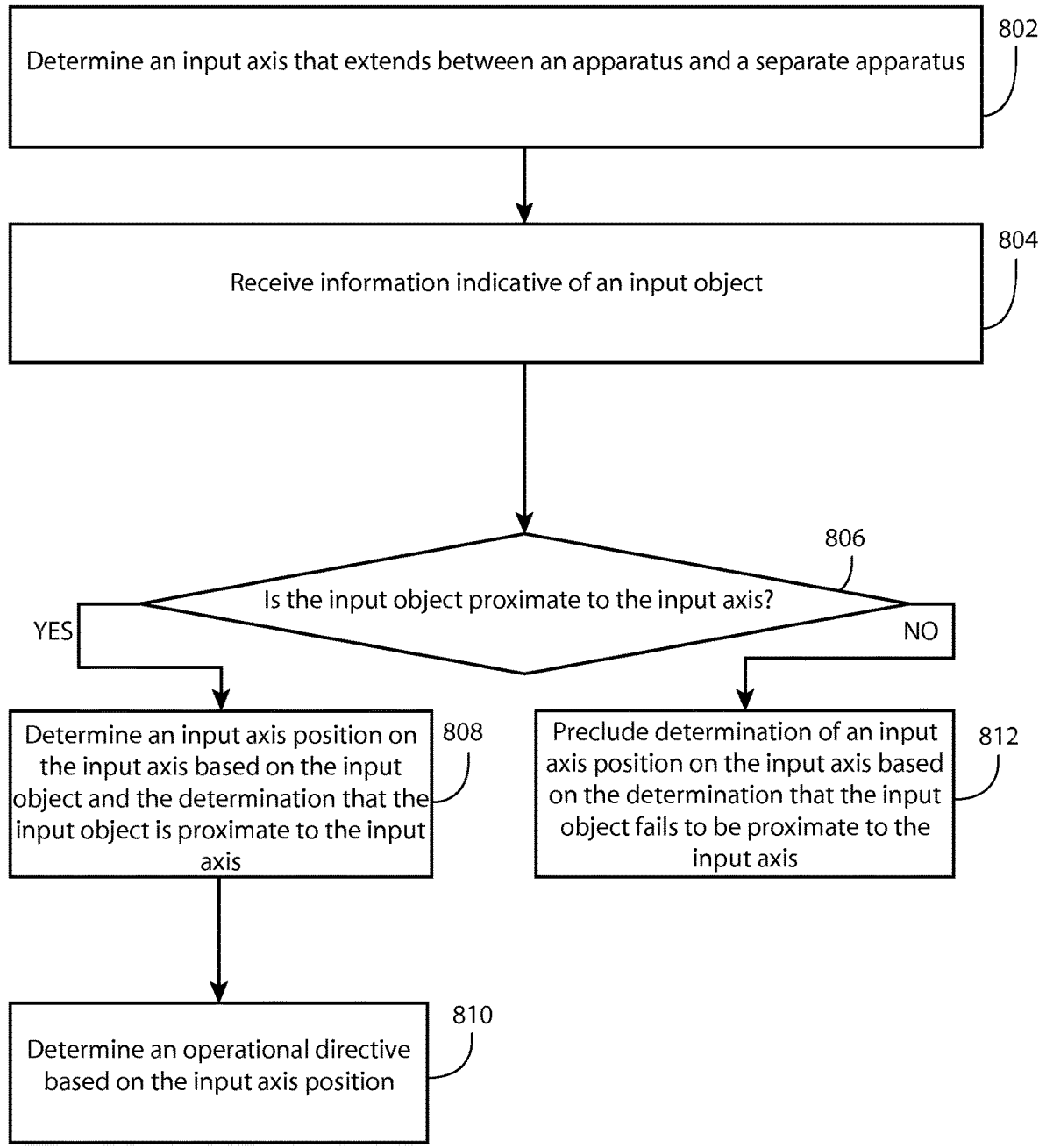
FIG. 8 is a flow diagram illustrating activities associated with determination of whether an input object is proximate to an input axis according to at least one example embodiment.

FIG. 8 is a flow diagram illustrating activities associated with determination of whether an input object is proximate to an input axis according to at least one example embodiment. In at least one example embodiment, there is a set of operations that corresponds with the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8.

As discussed previously, in many circumstances, it may be desirable to determine an input axis position when the input object is proximate to the input axis, and to preclude determination of an input axis position when the input object fails to be proximate to the input axis. For example, a user of the apparatus may desire to avoid unintentional interaction with the apparatus, to preclude inadvertent input associated with the input axis, and/or the like.

At block 802, the apparatus determines an input axis that extends between an apparatus and a separate apparatus. The determination, the input axis, the apparatus, and the separate apparatus may be similar as described regarding FIGS. 3A-3C.

At block 804, the apparatus receives information indicative of an input object. The receipt and the input object may be similar as described regarding FIGS. 3A-3C.

At block 806, the apparatus determines whether the input object is proximate to the input axis. If the apparatus determines that the input object is proximate to the input axis, flow proceeds to block 808. If the apparatus determines that the input object fails to be proximate to the input axis, flow proceeds to block 812. The determination and the input object being proximate to the input axis may be similar as described regarding FIGS. 3A-3C.

At block 808, the apparatus determines an input axis position on the input axis based, at least in part, on the input object and the determination that the input object is proximate to the input axis. The determination and the input axis position may be similar as described regarding FIGS. 3A-3C, FIGS. 4A-4C, FIGS. 5A-5C, and FIGS. 6A-6B.

At block 810, the apparatus determines an operational directive based, at least in part, on the input axis position. The determination and the operational directive may be similar as described regarding FIGS. 3A-3C, FIGS. 4A-4C, FIGS. 5A-5C, and FIGS. 6A-6B.

At block 812, the apparatus precludes determination of an input axis position on the input axis based, at least in part, on the determination that the input object fails to be proximate to the input axis. The preclusion, the determination, and the input axis position may be similar as described regarding FIGS. 3A-3C, FIGS. 4A-4C, FIGS. 5A-5C, and FIGS. 6A-6B.

Figure 9:
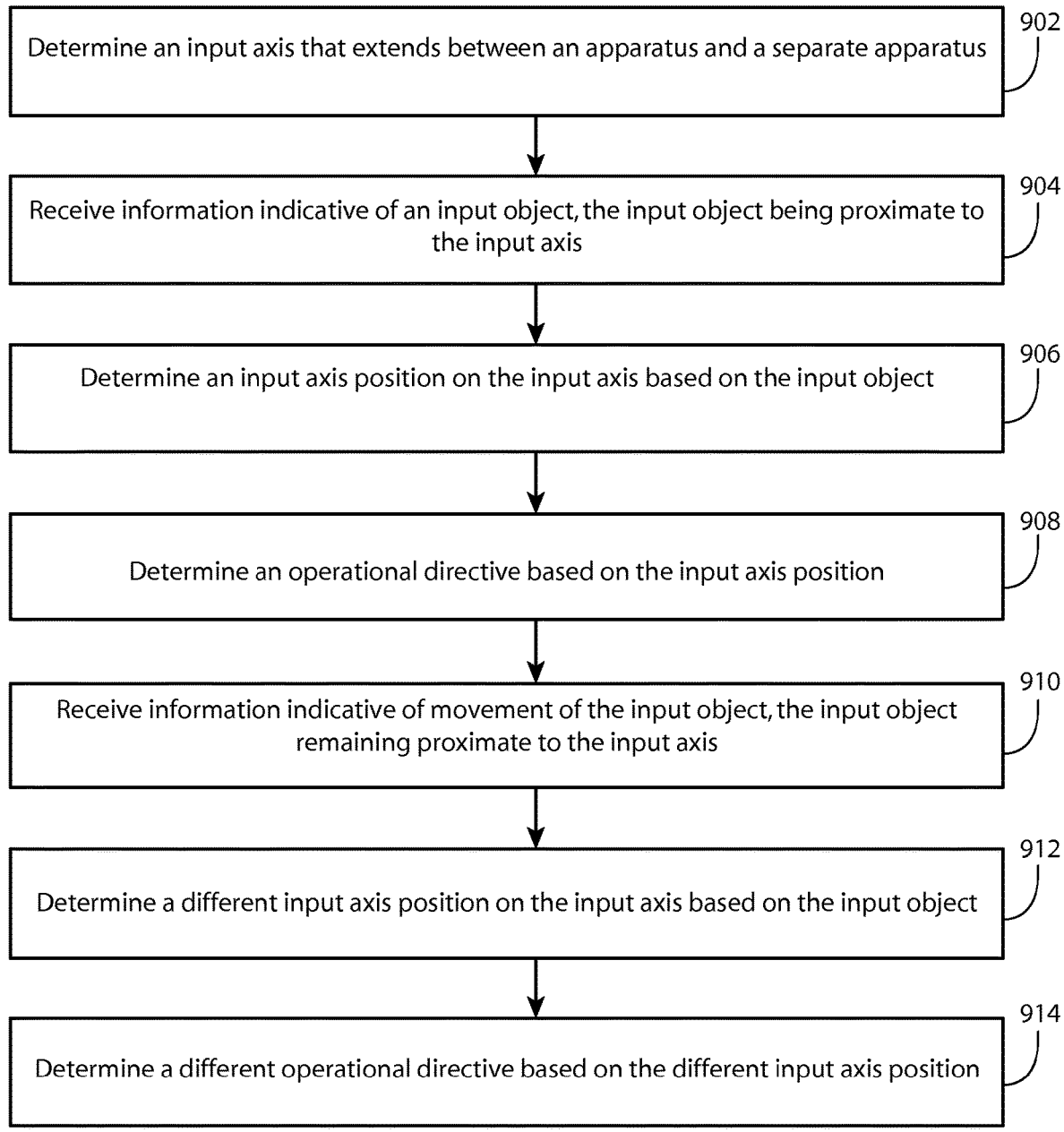
FIG. 9 is a flow diagram illustrating activities associated with determination of an operational directive based, at least in part, on an input axis position according to at least one example embodiment.

FIG. 9 is a flow diagram illustrating activities associated with determination of an operational directive based, at least in part, on an input axis position according to at least one example embodiment. In at least one example embodiment, there is a set of operations that corresponds with the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 9.

As discussed previously, in many circumstances, it may be desirable to configure an apparatus such that a user of the apparatus may determine an operational directive based, at least in part, on movement of an input object from an input axis position to a different input axis position.

At block 902, the apparatus determines an input axis that extends between an apparatus and a separate apparatus. The determination, the input axis, the apparatus, and the separate apparatus may be similar as described regarding FIGS. 3A-3C.

At block 904, the apparatus receives information indicative of an input object, the input object being proximate to the input axis. The receipt, the input object, and the input object being proximate to the input axis may be similar as described regarding FIGS. 3A-3C.

At block 906, the apparatus determines an input axis position on the input axis based, at least in part, on the input object. The determination and the input axis position may be similar as described regarding FIGS. 3A-3C, FIGS. 4A-4C, FIGS. 5A-5C, and FIGS. 6A-6B.

At block 908, the apparatus determines an operational directive based, at least in part, on the input axis position. The determination and the operational directive may be similar as described regarding FIGS. 3A-3C, FIGS. 4A-4C, FIGS. 5A-5C, and FIGS. 6A-6B.

At block 910, the apparatus receives information indicative of movement of the input object, the input object remaining proximate to the input axis. The receipt, the movement of the input object, and the input object remaining proximate to the input axis may be similar as described regarding FIGS. 3A-3C, FIGS. 4A-4C, FIGS. 5A-5C, and FIGS. 6A-6B.

At block 912, the apparatus determines a different input axis position on the input axis based, at least in part, on the input object. The determination and the different input axis position may be similar as described regarding FIGS. 3A-3C, FIGS. 4A-4C, FIGS. 5A-5C, and FIGS. 6A-6B.

At block 914, the apparatus determines a different operational directive based, at least in part, on the different input axis position. The determination and the different operational directive may be similar as described regarding FIGS. 3A-3C, FIGS. 4A-4C, FIGS. 5A-5C, and FIGS. 6A-6B.

Figures 1, 10:
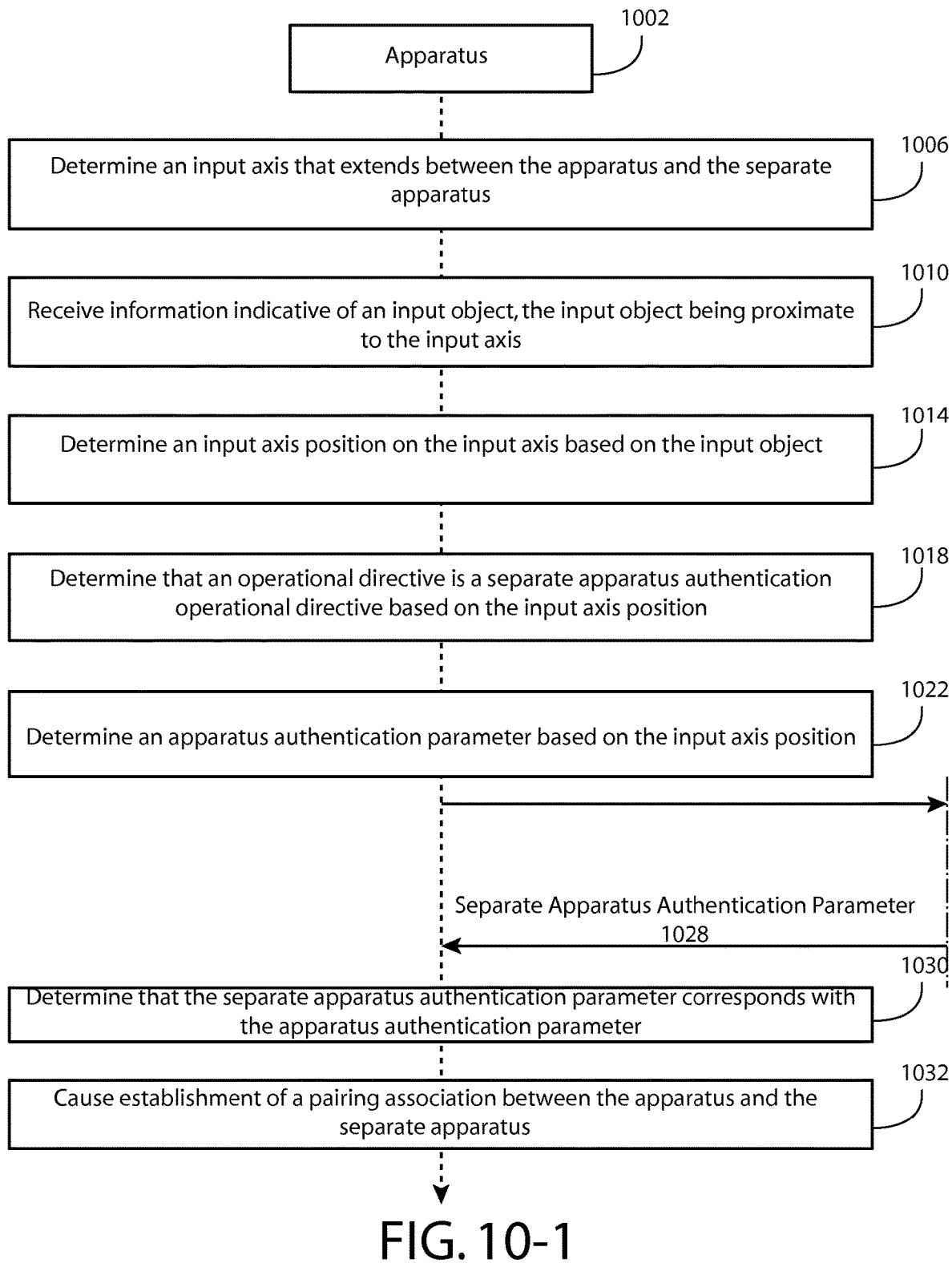
FIG. 10 is an interaction diagram illustrating activities associated with causing establishment of a pairing association between an apparatus and a separate apparatus according to at least one example embodiment.
Figures 2, 10:
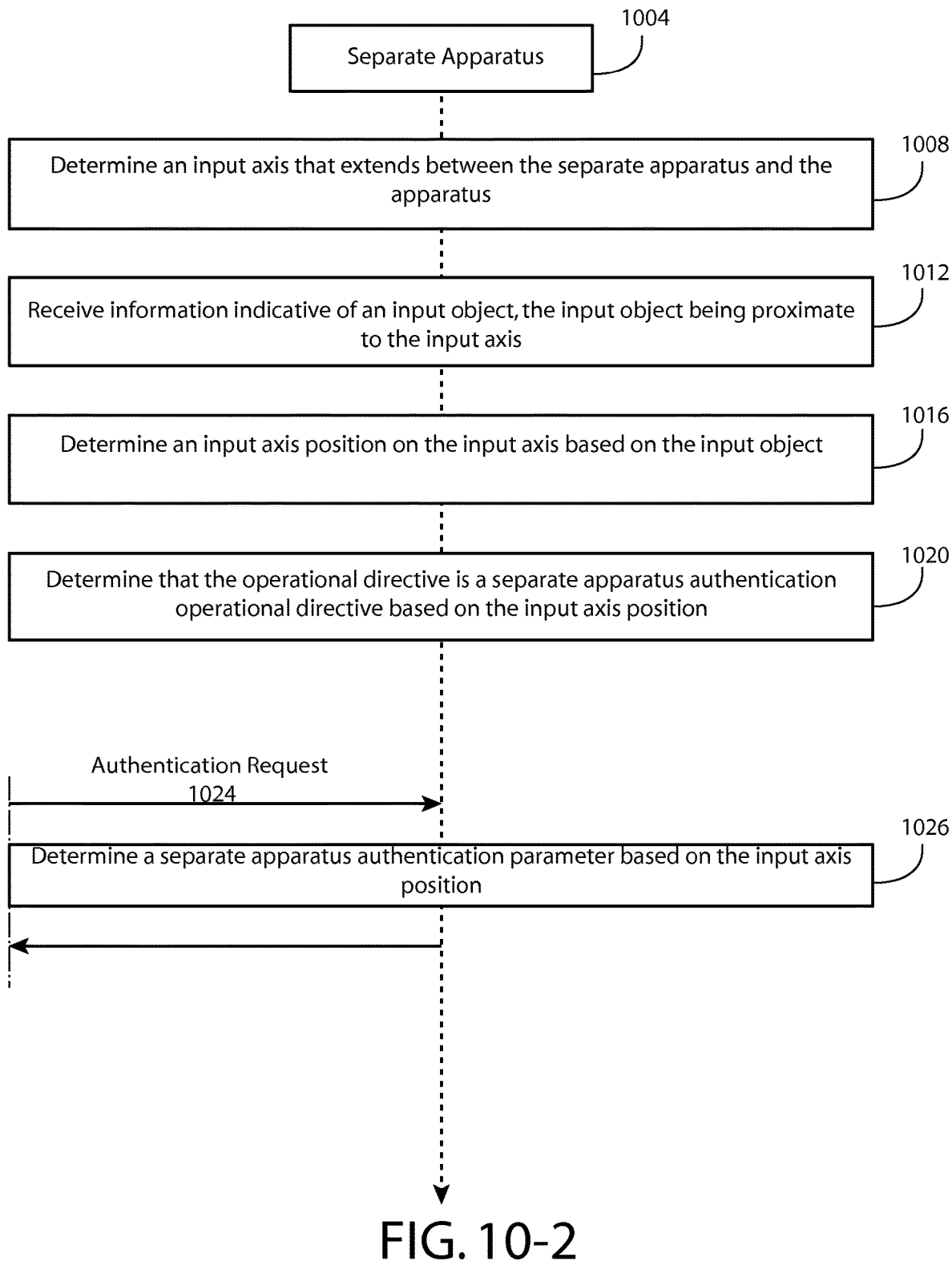

FIG. 10 is a simplified interaction diagram illustrating activities associated with causing establishment of a pairing association between an apparatus and a separate apparatus according to at least one example embodiment. In at least one example embodiment, there is a set of operations that corresponds with, at least some of, the activities of FIG. 10. For example, there may be a set of operations associated with activities of one or more apparatuses of FIG. 10. An apparatus, for example electronic apparatus 10 of FIG. 1, or a portion thereof, apparatus 202 of FIG. 2, or a portion thereof, apparatus 204 of FIG. 2, or a portion thereof, or apparatus 206 of FIG. 2, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 10.

In many circumstances, a user of an electronic apparatus and a separate electronic apparatus may desire to interact with one or more of the electronic apparatuses by way of an input axis that extends from the electronic apparatus to the separate electronic apparatus. In such circumstances, the user may desire to ensure that an association the electronic apparatus and the separate electronic apparatus has been established, that communications between the electronic apparatus and the separate electronic apparatus are secure, and/or the like. As such, it may be desirable to configure an electronic apparatus such that a user of the electronic apparatus may indicate a desire for the electronic apparatus to establish a connection with a particular separate electronic apparatus in a manner that is quick, easy, and intuitive. For example, a user may desire to trace a virtual line between an electronic apparatus and a separate electronic apparatus such that the virtual line connects the electronic apparatus and the separate electronic apparatus. In this manner, the user may indicate to the electronic apparatus that the user desires to interact with the electronic apparatus by way of an input axis that extends from the electronic apparatus to the separate electronic apparatus, indicate to the separate electronic apparatus that the user desires to interact with the separate electronic apparatus by way of an input axis that extends from the separate electronic apparatus to the electronic apparatus, indicate to the electronic apparatus that the user desires to interact with the separate electronic apparatus by way of an input axis that extends from the electronic apparatus to the separate electronic apparatus, and/or the like.

In at least one example embodiment, an apparatus receives information indicative of movement of an input object. In such an example, the apparatus may determine a different input axis position on the input axis based, at least in part, on the input object. In at least one example embodiment, the apparatus determines that the different input axis position is further from the apparatus than the input axis position. For example, the user may trace a virtual line from the apparatus and to the separate apparatus. As such, the input object may initially be located at a position that corresponds to an input axis position that is proximate to the apparatus, and may move to a different position that corresponds with a different input axis position that is proximate to the separate apparatus. In such an example embodiment, the apparatus may determine the operational directive based, at least in part, on the determination that the different input axis position is further from the apparatus than the input axis position.

In such circumstances, it may be desirable to perform one or more operations associated with an operational directive such that an association between the electronic apparatus and the separate electronic apparatus is established. In at least one example embodiment, an operational directive is a separate apparatus authentication directive. The operational directive type may correspond with a separate apparatus authentication operational directive that causes establishment of a pairing association between the apparatus and the separate apparatus. As such, in at least one example embodiment, the operational directive causes the apparatus to determine an apparatus authentication parameter based, at least in part, on the input axis position. In such an example embodiment, the apparatus may send an authentication request to the separate apparatus, and subsequently receive an authentication response from the separate apparatus that is indicative of a separate apparatus authentication parameter. In such an example embodiment, the apparatus may determine that the separate apparatus authentication parameter corresponds with the apparatus authentication parameter, and causation of establishment of a pairing association between the apparatus and the separate apparatus based, at least in part, on the correspondence of the apparatus authentication parameter and the separate apparatus authentication parameter.

Similarly, the apparatus may receive an authentication request from a separate apparatus. In such an example, the apparatus may determine an operational directive that causes the apparatus to perform determination of an apparatus authentication parameter based, at least in part, on the input axis position and to send an authentication response that is indicative of the apparatus authentication parameter to the separate apparatus.

In some circumstances, an electronic apparatus may be associated with more than one separate electronic apparatus. For example, a user of the electronic apparatus may commonly use the electronic apparatus in conjunction with another electronic apparatus and a different electronic apparatus. As such, a pairing association between the electronic apparatus and the other electronic apparatus, and between the electronic apparatus and the different electronic apparatus, may have been previously established. In such circumstances, the user may desire at times to utilize the electronic apparatus in conjunction with the other electronic apparatus, and may desire at other times to utilize the electronic apparatus in conjunction with the different electronic apparatus. As such, it may be desirable to configure an electronic apparatus such that the user of the electronic apparatus may indicate the user's desire to utilize the electronic apparatus in conjunction with the other electronic apparatus, to utilize the electronic apparatus in conjunction with the different electronic apparatus, and/or the like, in a manner that is easy and intuitive. In at least one example embodiment, an apparatus identifies the separate apparatus by way of an input associated with an input axis that extends between the apparatus and the separate apparatus. For example, if the user desires to utilize the user's electronic apparatus in conjunction with the user's other electronic apparatus, the user may indicate such a desire by way of the input axis that extends between the electronic apparatus and the other electronic apparatus. Alternatively, for example, if the user desires to utilize the user's electronic apparatus in conjunction with the user's different electronic apparatus, the user may indicate such a desire by way of the input axis that extends between the electronic apparatus and the different electronic apparatus. In this manner, the user may indicate the user's desire to interact with a specific separate apparatus, and to cause establishment of an operative connection between the apparatus and the specific separate apparatus, by way of an input associated with an input axis that extends between the apparatus and the specific separate apparatus.

In the example of FIG. 10, apparatus 1002 may be a phone, a tablet, a computer, a wearable apparatus, a head worn apparatus, an electronic apparatus, and/or the like. In the example of FIG. 10, separate apparatus 1004 may be a phone, a tablet, a computer, a wearable apparatus, a head worn apparatus, an electronic apparatus, and/or the like. In at least one example embodiment, apparatus 1002 and separate apparatus 1004 communicate by way of a wireless communication channel, a cellular communication channel, a wireless local area network communication channel, a wideband communication channel, a Bluetooth communication channel, a near field communication channel, a radio frequency communication channel, an infrared communication channel, and/or the like.

At block 1006, apparatus 1002 determines an input axis that extends between apparatus 1002 and separate apparatus 1004. The determination and the input axis may be similar as described regarding FIGS. 3A-3C.

At block 1008, separate apparatus 1004 determines an input axis that extends between separate apparatus 1004 and apparatus 1002. The determination and the input axis may be similar as described regarding FIGS. 3A-3C.

At block 1010, apparatus 1002 receives information indicative of an input object, the input object being proximate to the input axis. The receipt, the input object, and the input object being proximate to the input axis may be similar as described regarding FIGS. 3A-3C.

At block 1012, separate apparatus 1004 receives information indicative of an input object, the input object being proximate to the input axis. The receipt, the input object, and the input object being proximate to the input axis may be similar as described regarding FIGS. 3A-3C.

At block 1014, apparatus 1002 determines an input axis position on the input axis based, at least in part, on the input object. The determination and the input axis position may be similar as described regarding FIGS. 3A-3C, FIGS. 4A-4C, FIGS. 5A-5C, and FIGS. 6A-6B.

At block 1016, separate apparatus 1004 determines an input axis position on the input axis based, at least in part, on the input object. The determination and the input axis position may be similar as described regarding FIGS. 3A-3C, FIGS. 4A-4C, FIGS. 5A-5C, and FIGS. 6A-6B.

At block 1018, apparatus 1002 determines an operational directive based, at least in part, on the input axis position. The determination and the operational directive may be similar as described regarding FIGS. 3A-3C, FIGS. 4A-4C, FIGS. 5A-5C, and FIGS. 6A-6B. In the example of FIG. 10, the operational directive is determined to be a separate apparatus authentication operational directive based, at least in part, on the input axis position.

At block 1020, separate apparatus 1004 determines an operational directive based, at least in part, on the input axis position. The determination and the operational directive may be similar as described regarding FIGS. 3A-3C, FIGS. 4A-4C, FIGS. 5A-5C, and FIGS. 6A-6B. In the example of FIG. 10, the operational directive is determined to be a separate apparatus authentication operational directive based, at least in part, on the input axis position.

At block 1022, apparatus 1002 determines an apparatus authentication parameter based, at least in part, on the input axis position.

At interaction 1024, apparatus 1002 sends an authentication request to separate apparatus 1004. In this manner, separate apparatus 1004 receives the authentication request from apparatus 1002.

At block 1026, separate apparatus 1004 determines a separate apparatus authentication parameter based, at least in part, on the input axis position.

At interaction 1028, separate apparatus 1004 sends an authentication response to apparatus 1002 that is indicative of the separate apparatus authentication parameter. In this manner, apparatus 1002 receives the authentication response from separate apparatus 1004 that is indicative of the separate apparatus authentication parameter.

At block 1030, apparatus 1002 determines that the separate apparatus authentication parameter corresponds with the apparatus authentication parameter.

At block 1032, apparatus 1002 causes establishment of a pairing association between apparatus 1002 and separate apparatus 1004.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. For example, block 908 of FIG. 9 may be performed after block 912 of FIG. 9. Furthermore, if desired, one or more of the above-described functions may be optional or may be combined. For example, block 706 of FIG. 7 may be optional and/or combined with block 704 of FIG. 7.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. A method comprising:
   determining an input axis that extends between a point associated with a sensor of an apparatus and a point associated with a separate apparatus;
   receiving information indicative of an input object, the input object being within a threshold distance of the input axis;
   determining an input position relative to the input axis extending between the point associated with the sensor of the apparatus and the point associated with the separate apparatus based, at least in part, on the input object and data detected with at least the sensor;
   causing performance of an operational directive based, at least in part, on the input position relative to the input axis;
   receiving different information indicative of the input object, the input object failing to be within the threshold distance of the input axis; and
   in response to determining that the input object fails to be within the threshold distance of the input axis, precluding performance of the operational directive.

2. The method of claim 1, wherein determining the input position relative to the input axis comprises determining an input object correspondence delineation perpendicular to the input axis that intersects at least a part of the input object and determining the input position to be a position relative to the input axis where the input object correspondence delineation intersects the input axis.

3. The method of claim 1, wherein determining of the input position relative to the input axis comprises determining of the input position to be a position relative to the input axis where the input object intersects the input axis.

4. The method of claim 1, further comprising causing performance of one or more operation in conformance with the operational directive.

5. The method of claim 1, further comprising:
   receiving information indicative of movement of the input object, the input object remaining within the threshold distance of the input axis;
   determining a different input position relative to the input axis based, at least in part, on the input object; and
   determining a different operational directive based, at least in part, on the different input position.

6. The method of claim 1, wherein the operational directive causes the apparatus to perform:
   determining an apparatus authentication parameter based, at least in part, on the input position;
   sending an authentication request to the separate apparatus;
   receiving an authentication response from the separate apparatus that is indicative of a separate apparatus authentication parameter;
   determining that the separate apparatus authentication parameter corresponds with the apparatus authentication parameter; and
   causing establishment of a pairing association between the apparatus and the separate apparatus.

7. The method of claim 6, further comprising:
   receiving information indicative of movement of the input object, the input object remaining within the threshold distance of the input axis;
   determining a different input position on the input axis based, at least in part, on the input object; and
   determining that the different input position is further from the apparatus than the input position, wherein determining the operational directive is based, at least in part, on determining that the different input position is further from the apparatus than the input position.

8. The method of claim 1, further comprising receiving an authentication request from the separate apparatus, wherein the operational directive causes the apparatus to perform:
   determining an apparatus authentication parameter based, at least in part, on the input position; and
   sending an authentication response to the separate apparatus that is indicative of the apparatus authentication parameter.

9. An apparatus comprising at least one processor and at least one memory, the memory comprising machine-readable instructions, that when executed cause the apparatus to:
   determine an input axis that extends between a point associated with a sensor of a device and a point associated with a separate apparatus;
   receive information indicative of an input object, the input object being within a threshold distance of the input axis;
   determine an input position relative to the input axis extending between the point associated with the sensor of the device and the point associated with the separate apparatus based, at least in part, on the input object and data detected with at least the sensor;
   cause performance of an operational directive based, at least in part, on the input position relative to the input axis;
   receive different information indicative of the input object, the input object failing to be within the threshold distance of the input axis; and
   in response to determining that the input object fails to be within the threshold distance of the input axis, preclude performance of the operational directive.

10. The apparatus of claim 9, wherein determination the input position relative to the input axis comprises determination an input object correspondence delineation perpendicular to the input axis that intersects at least a part of the input object and determination the input position to be a position relative to the input axis where the input object correspondence delineation intersects the input axis.

11. The apparatus of claim 9, wherein determination of the input position relative to the input axis comprises determination of the input position to be a position on the input axis where the input object intersects the input axis.

12. The apparatus of claim 9, further comprising machine-readable instructions, that when executed cause the apparatus to:
perform one or more operation in conformance with the operational directive.

13. The apparatus of claim 9, further comprising machine-readable instructions, that when executed cause the apparatus to:
receive information indicative of movement of the input object, the input object remaining within the threshold distance of the input axis;
determine a different input position relative to the input axis based, at least in part, on the input object; and
determine a different operational directive based, at least in part, on the different input position.

14. The apparatus of claim 9, wherein the operational directive causes the apparatus to:
determine an apparatus authentication parameter based, at least in part, on the input position;
send an authentication request to the separate apparatus;
receive an authentication response from the separate apparatus that is indicative of a separate apparatus authentication parameter;
determine that the separate apparatus authentication parameter corresponds with the apparatus authentication parameter; and
cause establishment of a pairing association between the device and the separate apparatus.

15. The apparatus of claim 14, further comprising machine-readable instructions, that when executed cause the apparatus to:
receive information indicative of movement of the input object, the input object remaining within the threshold distance of the input axis;
determine a different input position on the input axis based, at least in part, on the input object; and
determine that the different input position is further from the device than the input position, wherein determination the operational directive is based, at least in part, on determination that the different input position is further from the device than the input position.

16. The apparatus of claim 9, further comprising machine-readable instructions, that when executed cause the apparatus to receive an authentication request from the separate apparatus, wherein the operational directive causes the apparatus to determine an apparatus authentication parameter based, at least in part, on the input position; and send an authentication response to the separate apparatus that is indicative of the apparatus authentication parameter.

17. The method of claim 1, wherein the point associated with the separate apparatus is a visual marker of the separate apparatus.

18. The method of claim 1, wherein the operational directive is further determined based on a distance of the input object to at least one of the apparatus or the separate apparatus.

* * * * *